US012642182B2

(12) United States Patent
Ballard

(10) Patent No.: US 12,642,182 B2
(45) Date of Patent: Jun. 2, 2026

(54) SIDE LOADING A HAY BALE

(71) Applicant: Pomme de Terre River Valley Products and Consulting, LLC, Greenfield, MO (US)

(72) Inventor: Brian Ballard, Greenfield, MO (US)

(73) Assignee: Pomme de Terre River Valley Products and Consulting, LLC, Greenfield, MO (US)

( * ) Notice: Subject to any disclaimer, the term of this patent is extended or adjusted under 35 U.S.C. 154(b) by 0 days.

(21) Appl. No.: 18/767,327

(22) Filed: Jul. 9, 2024

(65) Prior Publication Data

US 2026/0013440 A1 Jan. 15, 2026

(51) Int. Cl.
*A01D 90/08* (2006.01)
*A01D 87/12* (2006.01)

(52) U.S. Cl.
CPC ........... *A01D 90/08* (2013.01); *A01D 87/127* (2013.01)

(58) Field of Classification Search
CPC ....... G05B 2219/39259; G05D 1/0255; G05D 1/0278; G05D 2107/21; B65G 65/005; A01D 87/127; A01D 90/08; A01D 2087/128; A01D 87/122; A01D 87/003; A01D 89/001
See application file for complete search history.

(56) References Cited

U.S. PATENT DOCUMENTS

| | | |
|---|---|---|
| 3,484,003 A | 12/1969 | Strandberg et al. |
| 4,044,963 A | 8/1977 | Hostetler |
| 4,101,081 A | 7/1978 | Ritter et al. |
| 4,259,034 A * | 3/1981 | Ward ..................... A01D 90/08 |
| | | 414/789.2 |
| 4,261,676 A | 4/1981 | Balling, Sr. |
| 4,329,102 A | 5/1982 | Gray |

(Continued)

FOREIGN PATENT DOCUMENTS

| | | |
|---|---|---|
| CA | 2226913 A1 | 3/1999 |
| CN | 208774620 U | 4/2019 |

(Continued)

OTHER PUBLICATIONS

PCT International Search Report and Written Opinion in International Appln. No. PCT/US2024/024575, mailed on Jun. 26, 2024, 11 pages.

(Continued)

*Primary Examiner* — Gregory W Adams
(74) *Attorney, Agent, or Firm* — Fish & Richardson P.C.

(57) ABSTRACT

A vehicle and a method for side loading a hay bale. The vehicle has a frame, a side loader mechanism, and a storage assembly. The frame has a side oriented parallel to a direction of travel of the vehicle. The side loader mechanism is pivotably coupled to the side of the frame and pivots between an extended position and a retracted position. The side loader mechanism has a first loader arm and a second loader arm which open and close relative to one another, to thereby, squeeze a hay bale between respective ends of the first loader arm and the second loader arm. The storage assembly receives the hay bale from the side loader mechanism at a first location on the vehicle and conveys the hay bale along a path relative to the side loader mechanism from the first location to a second location on the vehicle.

17 Claims, 10 Drawing Sheets

(56) References Cited

U.S. PATENT DOCUMENTS

| | | | |
|---|---|---|---|
| 4,376,607 A | 3/1983 | Gibson | |
| 4,441,845 A | 4/1984 | Gibson | |
| 4,459,075 A | 7/1984 | Eichenberger | |
| 4,498,829 A * | 2/1985 | Spikes | A01D 90/08 |
| | | | 414/781 |
| 4,578,008 A | 3/1986 | Gleason | |
| 4,579,497 A | 4/1986 | Nine | |
| 4,594,041 A | 6/1986 | Hosteler | |
| 4,621,776 A | 11/1986 | Hostetler et al. | |
| 4,741,656 A | 5/1988 | Bishop | |
| 4,778,322 A | 10/1988 | Stronski | |
| 4,789,289 A | 12/1988 | Wilson | |
| 4,868,796 A * | 9/1989 | Ahrens | G01S 15/872 |
| | | | 414/730 |
| 4,961,679 A | 10/1990 | Van Eecke et al. | |
| 5,025,992 A | 6/1991 | Niebur | |
| 5,062,757 A | 11/1991 | Eichenauer | |
| 5,281,068 A | 1/1994 | Bruce | |
| 5,288,193 A | 2/1994 | Warburton et al. | |
| 5,320,472 A | 6/1994 | Matlack | |
| 5,340,259 A * | 8/1994 | Flaskey | A01D 90/083 |
| | | | 414/24.5 |
| 5,441,377 A | 8/1995 | Cataldie, Jr. | |
| 5,584,636 A | 12/1996 | Ramsey et al. | |
| 5,584,637 A | 12/1996 | Jensen et al. | |
| 5,618,146 A | 4/1997 | Cooper | |
| 5,647,716 A | 7/1997 | Tilley | |
| 5,690,461 A | 11/1997 | Tilley | |
| 5,725,346 A | 3/1998 | Davina | |
| 5,882,163 A * | 3/1999 | Tilley | A01D 90/08 |
| | | | 414/812 |
| 5,899,652 A | 5/1999 | Graham | |
| 5,975,824 A | 11/1999 | Hostetler | |
| 6,079,926 A | 6/2000 | Cox et al. | |
| 6,099,227 A | 8/2000 | Shellhammer | |
| 6,126,374 A | 10/2000 | Carls | |
| 6,247,538 B1 * | 6/2001 | Takeda | G05D 1/0251 |
| | | | 37/348 |
| 6,478,522 B2 | 11/2002 | Babb | |
| 6,704,619 B1 * | 3/2004 | Coleman | G05D 1/0255 |
| | | | 701/472 |
| 7,252,190 B2 | 8/2007 | Priepke | |
| 7,887,275 B2 | 2/2011 | Anderson | |
| 8,474,222 B2 | 7/2013 | Shoemaker | |
| 8,585,342 B2 * | 11/2013 | Smith | A01D 85/005 |
| | | | 414/772 |
| 8,967,934 B1 | 3/2015 | Palmlund et al. | |
| 10,028,439 B2 * | 7/2018 | Van Bentzinger | ............... |
| | | | A01D 41/1278 |
| 10,091,937 B2 | 10/2018 | Fay et al. | |
| 10,212,887 B2 | 2/2019 | Ramer et al. | |
| 11,337,373 B1 | 5/2022 | Kroskob | |
| 2003/0031533 A1 | 2/2003 | Delaurier | |
| 2009/0162169 A1 | 6/2009 | Kenna | |
| 2009/0214324 A1 * | 8/2009 | Grinnell | A01G 9/143 |
| | | | 414/467 |
| 2013/0238125 A1 * | 9/2013 | Suzuki | B25J 9/1697 |
| | | | 700/253 |
| 2019/0357440 A1 | 11/2019 | Desrochers et al. | |
| 2022/0142052 A1 * | 5/2022 | Corriher | B25J 9/1065 |
| 2024/0349652 A1 | 10/2024 | Ballard | |

FOREIGN PATENT DOCUMENTS

| | | | | |
|---|---|---|---|---|
| FR | 2560488 A1 * | 9/1985 | ........... | A01D 90/083 |
| FR | 2585534 A1 | 2/1987 | | |
| GB | 2273280 A * | 6/1994 | ............. | A01D 90/08 |

OTHER PUBLICATIONS

PCT International Search Report and Written Opinion in International Appln. No. PCT/US2025/036420, mailed on Nov. 6, 2025, 20 pages.

* cited by examiner

RECEIVE A CONTROL SIGNAL INDICATING TO RETRACT A LOADER ARM.
510

OPERATE THE LOADER ARM TO MOVE FROM THE EXTENDED POSITION TO THE RETRACED POSITION.
520

OPERATE A STORAGE ASSEMBLY TO REMOVE THE HAY BALE FROM LOADER ARM.
530

EXTEND THE LOADER ARM
540

SIDE LOADING A HAY BALE

TECHNICAL FIELD

This disclosure relates to a vehicle for agricultural use. In particular, this disclosure relates to a trailer and trailer loading system using a hydraulic actuated lift.

BACKGROUND

Agricultural products, such as hay bales, at one location are loaded onto vehicles for transportation to a different location. The agricultural products can be transported to different locations where they can be unloaded for storage, transferred to another vehicle for further shipment and distribution, or placed in a field for consumption by livestock.

SUMMARY

This disclosure describes systems and methods related to loading an agricultural vehicle such as a truck or trailer with e.g., hay bales. For example, implementations of the disclosed system include a trailer with a loading system. The loading system loads a hay bale onto a trailer using a loader assembly to move the hay bale from the ground onto the trailer. The loading system uses a storage assembly to move the hay bale along the trailer so another hay bale can be loaded onto the trailer by the loading assembly. The trailer has a frame, with the loader assembly and the storage assembly mounted to the frame.

In an example aspect, a vehicle includes a frame, a side loader mechanism, and a storage assembly. The frame includes a side oriented parallel to a direction of travel of the vehicle. The side loader mechanism pivotably coupled to the side of the frame and pivots between an extended position and a retracted position. The side loader mechanism has a first loader arm and a second loader arm. The first loader arm and the second loader arm open and close relative to one another, to thereby, squeeze a hay bale between respective ends of the first loader arm and the second loader arm. At least one of the first loader arm or the second loader arm have a spike extending from its respective end and parallel to the side of the frame. The storage assembly is mounted to the frame and positioned relative to the side loader mechanism. The storage assembly receives the hay bale from the side loader mechanism at a first location on the vehicle and conveys the hay bale along a path relative to the side loader mechanism from the first location to a second location on the vehicle.

In an example aspect combinable with any other aspect, the first loader arm and the second loader arm rotate relative to the side of the frame orthogonal to a direction of forward movement of the vehicle.

In an example aspect combinable with any other aspect, the second loader arm includes a spike extending outwards from a end and orthogonal to the second loader arm, and when in the extended position the second loader arm extends outside the frame with the spike oriented parallel to the side of the frame toward a rear end of the vehicle.

In an example aspect combinable with any other aspect, the first loader arm and the second loader arm are operable between a disengaged position spaced apart from the hay bale and an engaged position squeezing the hay bale.

In an example aspect combinable with any other aspect, the first loader arm and the second loader arm each have a plate coupled to the spike. The plates impart a squeezing force to the hay bale when the first loader arm and the second loader arm are in the engaged position.

In an example aspect combinable with any other aspect, the storage assembly includes a storage plate arranged to remove the hay bale from the first location as the storage plate is conveyed along the path in a first direction and with the first loader arm and the second loader arm in the retracted position.

In an example aspect combinable with any other aspect, the hay bale is a first hay bale and when the first hay bale has been placed on the vehicle, the storage assembly can further convey the storage plate along the path relative to the side loader mechanism to remove a second hay bale from the first location as the storage plate is conveyed along the path and with the first loader arm and the second loader arm in the retracted position; receive the second hay bale on the vehicle, the second hay bale in contact with the first hay bale; and simultaneously move the first hay bale and the second hay bale farther along the vehicle.

In an example aspect combinable with any other aspect, the vehicle includes an unloader assembly. The unloader assembly has an unloader bar, an unloader arm, a pulley, and a winch. The unloader arm is coupled to and extends from the unloader bar. The unloader arm is arranged to engage a forward surface of the hay bale. The pulley is coupled to the unloader bar. The winch has a cable. The winch is coupled to the frame at a first location. The cable extends from the winch through the pulley to a second location on the frame. Responsive to the winch decreasing a length of the cable, the unloader arm transposes the hay bale in a second direction opposite the first direction.

In an example aspect combinable with any other aspect, as the unloader arm transposes the hay bale in the second direction, the unloader assembly removes the hay bale from the vehicle.

In an example aspect combinable with any other aspect, the winch freewheels, extending a length of the cable responsive the storage plate moving along the path relative to the side loader mechanism as the storage plate removes the hay bale from the spike as the storage plate is conveyed along the path in the first direction and with the first loader arm and the second loader arm in the retracted position.

In an example aspect combinable with any other aspect, the vehicle includes a control system having multiple sensors and a controller. The sensors sense a position of the hay bale and transmit a signal representing the position of the hay bale. The controller performs operations including receiving the signal representing the position of the hay bale; comparing the position of the hay bale to an expected position of the hay bale to obtain a comparison result; and based on the comparison result, operating the side loader mechanism and the storage assembly to alter a location of the hay bale.

In an example aspect combinable with any other aspect, operating the side loader mechanism includes manipulating the first loader arm and the second loader arm from the retracted position to the extended position; manipulating the first loader arm and the second loader arm to a disengaged position to contact the hay bale; moving the first loader arm and the second loader arm to the engaged position; and responsive to moving the first loader arm and the second loader arm to the engaged position, squeezing the hay bale.

In an example aspect combinable with any other aspect, operating the side loader mechanism further includes manipulating the first loader arm and the second loader arm from the extended position to the retracted position with the hay bale squeezed between the first loader arm and the second loader arm; responsive to manipulating the first loader arm and the second loader arm to the retracted position with the hay bale on the spike, positioning the hay bale on the vehicle; moving the first loader arm and the second loader arm from the engaged position to the disengaged position; responsive to moving the first loader arm and the second loader arm from the engaged position to the disengaged position, disengaging the first loader arm and the second loader arm from the hay bale; and moving the first loader arm and the second loader arm to an intermediate position.

In an example aspect combinable with any other aspect, operating the storage assembly includes conveying the storage plate along the path relative to the side loader mechanism in the first direction, contacting the storage plate to the hay bale; conveying the storage plate and the hay bale along the path relative to the side loader mechanism in the first direction; and moving the hay bale the first location to the second location in the first direction.

In an example aspect combinable with any other aspect, the hay bale is a first hay bale and operating the storage assembly includes responsive to sensing a second hay bale in contact with the storage assembly, conveying the storage plate along the path relative to the side loader mechanism in the first direction; contacting the storage plate to the second hay bale; conveying the storage plate and the second hay bale along the path relative to the side loader mechanism in the first direction to contact the first hay bale; and simultaneously removing the second hay bale from the spike and moving the first hay bale and the second hay bale in the first direction.

In an example aspect combinable with any other aspect, the controller can further perform operations including rotating a drum of the winch; responsive to rotating a drum of the winch, reducing a length of the cable; responsive to reducing the length of the cable, conveying the unloader arm and the first and second hay bales in a second direction opposite the first direction; and responsive to conveying the unloader arm and the first and second hay bales in the second direction, removing at least one of the first and second hay bales from the vehicle.

In an example aspect combinable with any other aspect, the first loader arm and the second loader arm pivot independently about an axis substantially parallel to the side of the frame. Operating the side loader mechanism includes manipulating the first loader arm from the retracted position to the extended position; manipulating the first loader arm to align the spike of the first loader arm to engage the hay bale; moving the first loader arm to the engaged position; responsive to moving the first loader arm to the engaged position, piercing the hay bale with the spike of the first loader arm; detecting a condition of the hay bale indicating that the first loader arm and the second loader arm are both required to squeeze the hay bale to reposition the hay bale; manipulating the second loader arm from the retracted position to the extended position; manipulating the second loader arm to a position to engage the hay bale; moving the second loader arm from the disengaged position to the engaged position; and responsive to moving the second loader arm from the disengaged position to the engaged position, squeezing the hay bale between the first loader arm and the second loader arm.

In another example aspect, a method for side loading a hay bale includes manipulating a first loader arm having a first spike and a second loader arm having a second spike, the first loader arm and the second loader arm pivotably coupled to a side of a vehicle from a retracted position to an extended position, the side of the vehicle oriented parallel to a direction of travel of the vehicle; manipulating the first loader arm and the second loader arm to a position to contact a hay bale; moving the first loader arm and the second loader arm to an engaged position; responsive to moving the first loader arm and the second loader arm to the engaged position, squeezing the hay bale; manipulating the first loader arm and the second loader arm from the extended position to the retracted position with the hay bale squeezed between the first loader arm and the second loader arm; responsive to manipulating the first loader arm and the second loader arm to the retracted position with the hay bale on the first spike and the second spike, positioning the hay bale on the vehicle; moving the first loader arm and the second loader arm from the engaged position to a disengaged position; responsive to moving the first loader arm and the second loader arm from the engaged position to the disengaged position, disengaging the first loader arm and the second loader arm from the hay bale; and moving the first loader arm and the second loader arm to an intermediate position.

In an example aspect combinable with any other aspect, side loading the hay bale includes conveying the hay bale along a path relative to the side of the vehicle in a first direction and moving the hay bale a first location to a second location in the first direction.

In another example aspect, a control system includes multiple sensors and a controller. The sensors sense a position of a hay bale and transmit a signal representing the position of the hay bale. The controller performs operations including receiving the signal representing the position of the hay bale from one or more of the sensors; comparing the position of the hay bale to an expected position of the hay bale to obtain a comparison result; and based on the comparison result, operating a side loader assembly to alter a location of the hay bale relative to a trailer by: manipulating a first loader arm having a first spike and a second loader arm having a second spike from a retracted position to an extended position; manipulating the first loader arm and the second loader arm to a position to contact the hay bale; moving the first loader arm and the second loader arm to an engaged position; responsive to moving the first loader arm and the second loader arm to the engaged position, squeezing the hay bale; manipulating the first loader arm and the second loader arm from the extended position to the retracted position with the hay bale squeezed between the first loader arm and the second loader arm; responsive to manipulating the first loader arm and the second loader arm to the retracted position with the hay bale on the first spike and the second spike, positioning the hay bale on a vehicle; moving the first loader arm and the second loader arm from the engaged position to a disengaged position; responsive to moving the first loader arm and the second loader arm from the engaged position to the disengaged position, disengaging the first loader arm and the second loader arm from the hay bale; and moving the first loader arm and the second loader arm to an intermediate position.

Implementations of the present disclosure can realize one or more of the following advantages. The disclosed systems and methods can reduce the complexity of agricultural operations. For example, fewer vehicles are required to load and unload hay bales by combining the operations of loading and unloading a hay bale into a single piece of equipment (the hay bale trailer described herein), thereby reducing the complexity of agricultural operations. For instance, conventional agricultural processes require a tractor to load hay bales on a conventional trailer at one location and another tractor to unload the trailer at the unloading location. For example, using implementations of the disclosed system a single operator can load and unload hay bales from the trailer, reducing the complexity of agricultural operations. In some examples, a controller of the hay bale trailer can control loading and unloading operations based on signals from sensors. The controller can be operated by a human in full control or partial control (partially automated) of the loading and unloading operation. In some cases, the controller can be configured to provide fully automated (i.e., autonomous) control of the loading and unloading operations. In other words, loading and unloading the hay bale onto and off the hay bale trailer can be controlled by a human in the loop, on the loop, or out of the loop. Loading and unloading the hay bale with the controller reduces the complexity of agricultural operations.

The disclosed systems and methods can improve livestock health. For example, the controller can detect a hay bale in a rotten condition or a hay bale containing contaminants such as harmful or poisonous plants (i.e., a contaminated or bad hay bale) and in response to detecting the bad hay bale, the controller can bypass the bad hay bale. For example, the controller can generate a log and/or a map of the locations of the hay bales collected from the field to determine problem areas of the pasture. In some implementations, the controller can send a signal to the operator alerting the operator to the bad hay bale. In some implementations, the controller can direct (with or without human intervention) the hay bale trailer to load the bad hay bale and then unload the bad hay bale at an alternate location different than the planned location separate from livestock.

The disclosed systems and methods can increase personnel safety. For example, a single operator can load the hay bale onto and unload the hay bale from the trailer from a location separate from the hay bale using the controller, such as from the cab of a truck coupled to the hay bale trailer, increasing personnel safety. For example, the hay bale trailer can semi-autonomously or fully autonomously load and unload the hay bale, with the operator in a control center or no operator at all, increasing personnel safety.

The disclosed systems and methods can improve delivery accuracy. For example, the controller using the geographic location such as from cellular triangulation or satellite positioning, the placement of the hay bale in a field can be selected, improving hay bale delivery accuracy.

The disclosed systems and methods can reduce the time required to load hay bales on vehicles. For example, fewer operators are needed to load the hay bales, reducing the number of man-hours to load a field of hay bales.

The disclosed systems and methods can reduce total fuel consumption for agricultural operations. For example, fewer agricultural vehicles would be used to load and transport the same amount of hay bales. Thus, total fuel consumption for agricultural operations can be reduced.

The disclosed systems and methods can pick up defective hay bales. Some hay bales can be more difficult to lift and store than other hay bales, such as when a hay bale is defective (i.e., poorly consolidated due to improper baling, partially decomposed, or damaged), squeezing opposing sides of the hay bale can allow the hay bale to be lifted onto the trailer.

The disclosed systems and methods can increase the quantity of hay bales that can be picked up. Some hay bales may be situated on uneven ground. By using the side crimp loader, hay bales on uneven ground can be retrieved and placed on the trailer.

The disclosed systems and methods can increase hay bale loading efficiency. For example, the trailer can be positioned beside the hay bale to be loaded, and the crimp side loader can adjust to fit different lengths and sizes of hay bales, and reposition the hay bale from the ground on to the trailer, then the trailer can move directly to the next hay bale to be placed on the trailer without deviating around the previous location or backing up, increasing hay bale loading efficiency.

The disclosed systems and methods can allow lifting of different shapes of hay bales (i.e., square hay bales). In some cases, a spike may be of a size such that, when entering a hay bale tied together by a string, the spike may impart too much stress on the string, causing the string to weaken or fail, and the hay bale to subsequently fall apart. Squeezing, as the predominant coupling mechanism, on the hay bale held together by a string can be a preferred method of handling to maintain the structural integrity of the string and the hay bale.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure relates to and agricultural system for loading and unloading crops to/from a vehicle. For example, implementations of the present disclosure relate to loading a hay bale onto a vehicle, e.g., a hay bale trailer or truck. Using a trailer as an example, a hay bale trailer is equipped with a loader assembly and a storage assembly. The hay bale trailer has a frame, with the loader assembly and the storage assembly mounted to the frame. The hay bale is loaded onto a hay bale trailer using the loader assembly to move the hay bale from the ground onto the hay bale trailer. The storage assembly moves the hay bale along the hay bale trailer so that another hay bale can be loaded onto the hay bale trailer.

In one embodiment, the loader assembly has at least one loader arm having a first end rotatably coupled to the frame and a second end with a spike extending outwards from the second end and orthogonal to the loader arm. The loader arm can be manipulated between a retracted position and an extended position. When in the extended position, the loader arms extend outside the frame with the spike oriented parallel to the frame. In this position, the spike is oriented to impale a hay bale as the trailer moves in a forward direction. The storage assembly is positioned relative to the loader assembly such that the storage assembly conveys a storage plate along a path alongside the loader assembly. The storage plate is arranged to remove the hay bale from the spike as the storage plate is conveyed along the path in a first direction and with the loader arms in the retracted position.

Figure 1:
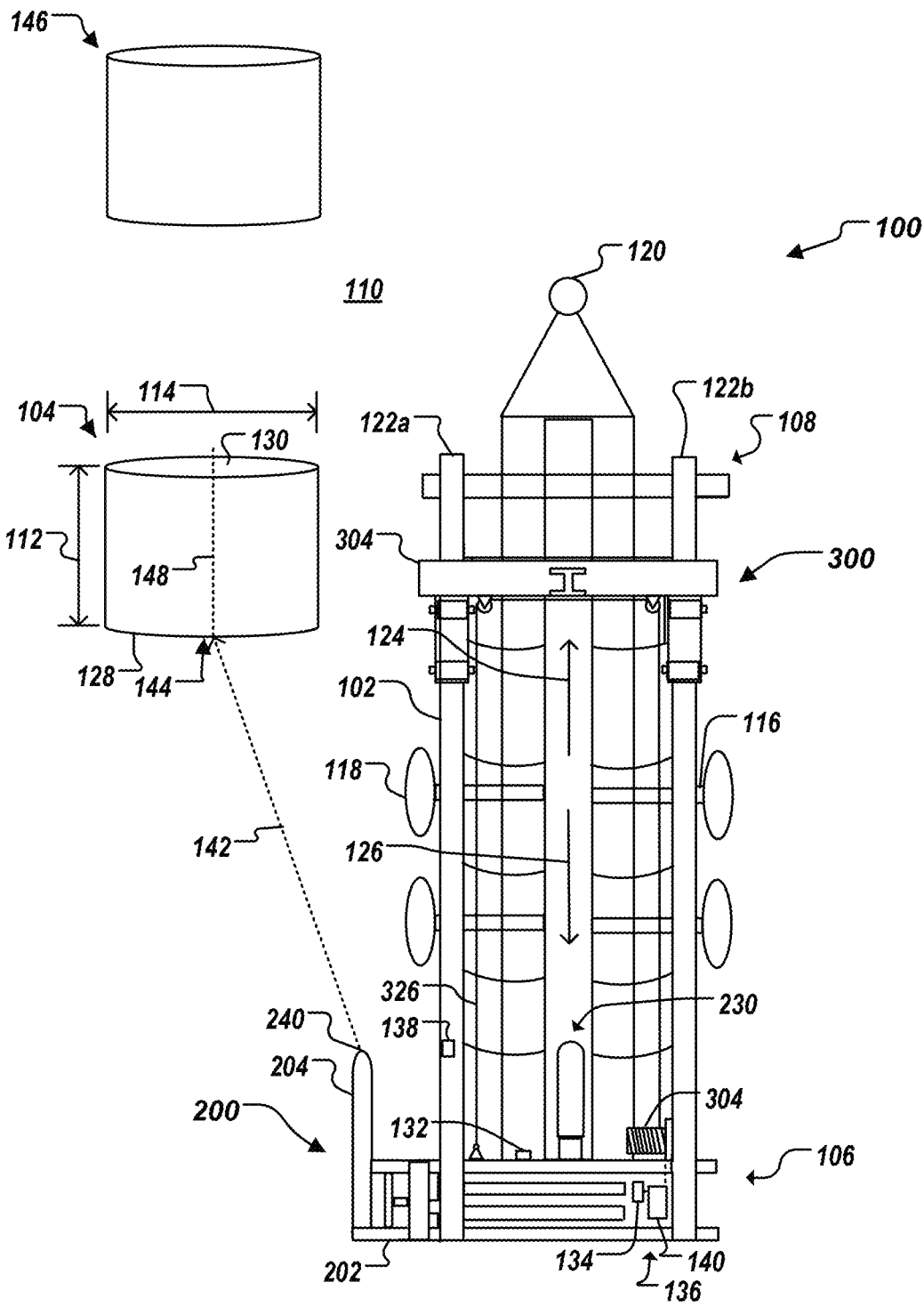
FIG. 1 shows a top view of a vehicle with a loader assembly, a storage assembly, and an unloader assembly.

FIG. 1 shows a top view of a vehicle 100 with a loader assembly 200, a storage assembly 230, and an unloader assembly 300. In some implementations, the vehicle 100 can be a trailer or a truck. The vehicle 100 has a frame 102 with a loader assembly 200, a storage assembly 230, and an unloader assembly 300 mounted to the frame 102.

The loader assembly 200 loads a hay bale 104 from a surface 110 of the Earth (i.e., the ground, a field, or a pasture) onto the vehicle 100. The loader assembly 200 is coupled to the frame 102 on a first end 106 of the frame 102. The first end 106 can be e.g., back end of the vehicle 100. In other implementations, the loader assembly 200 can be mounted towards a second end 108 (e.g., the front of the vehicle 100). The loader assembly 200 is described in more detail in reference to FIGS. 2A-2B.

The storage assembly 230 moves the hay bale 104 along the vehicle 100. The storage assembly 230 is mounted to the frame 102. In some cases, the storage assembly can be coupled to the loader assembly 200. The storage assembly 230 removes the hay bale 104 from the loader assembly 200. The storage assembly 230 moves the hay bale 104 along the vehicle 100 from the first end 106 towards the second end 108 (e.g., the front of the vehicle 100). The storage assembly 230 is described in more detail in reference to FIGS. 2A-2B.

The unloader assembly 300 is coupled to the frame 102 on the second end 108 of the frame 102 (e.g., the front end). The unloader assembly 300 moves hay bales 104 from the second end 108 to the first end 106 to unload the hay bales 104 from the vehicle 100 onto the ground 110. The unloader assembly 300 is described in more detail in reference to FIGS. 3A-3C.

As shown in FIG. 1, the hay bale 104 is a round hay bale (i.e., a cylinder or cylindrically shaped). However, in some implementations, the hay bale 104 can be a square bale (i.e., a cube or cuboid). The hay bale 104 is positioned on the ground 110. Round hay bales 104 have a length 112 and a diameter 114. In some cases, the length 112 of the hay bale 104 is between 20 inches and 96 inches (8 feet). In some cases, the diameter 114 of the hay bale 104 is between 20 inches and 72 inches (6 feet). The hay bale 104 has a weight, e.g., between 40 pounds and 1,650 pounds.

The hay bale 104 includes a mixture of grasses and weeds which are compacted and bound together (baled). Over time as the hay bale 104 sits, the grasses and weeds can decompose and rot. In some cases, the hay bale 104 may be exposed to moisture from the surrounding environment in the form of humidity or rain. The moisture can further decompose the grasses and weeds. In some cases, the grasses and weeds decomposing can mold internally. For example, some livestock such as horses are particularly sensitive to molded hay. In some cases, the grasses, weeds, and/or the decomposed grasses and weeds can be harmful to livestock if consumed. In some cases, particular weeds or grasses are toxic. In some cases, particular weeds and grasses may be toxic at certain times of the year (i.e., prussic acid in Johnson grass).

The vehicle 100 has axles 116 mechanically coupled to the frame 102. The vehicle 100 has wheels 118 rotatably coupled to the axles 116 and contacting the ground 110. The wheels 118 rotate about the axles 116 responsive to a vehicle (not shown), for example, a tractor or a truck, pulling or pushing the vehicle 100 to change the location of the vehicle 100. In some cases, the wheels 118 can be powered to move the vehicle 100. For example, the axles 116 can transfer power from an engine and transmission (not shown) of the vehicle 100 (e.g., the vehicle 100 can be self-propelled) or a power take off from the vehicle.

The vehicle 100 includes a hitch 120 coupled to the frame 102. The hitch 120 rotatably couples to and a ball receiver (not shown) of the vehicle. The hitch 120 and ball allow the vehicle to transfer force to the vehicle 100 to position the vehicle 100 relative to the hay bale 104.

The vehicle 100 includes a pair of rails 122a, 122b mounted to the frame 102. The rails 122a, 122b are positioned to receive the hay bale 104 from the loader assembly 200. The rails 122a, 122b extend between the first end 106 and the second end 108 of the vehicle 100. The rails 122a, 122b are spaced apart such that the hay bale 104 rests between the rails 122a, 122b when the hay bale 104 is positioned on the rails 122a, 122b by the loader assembly 200. The rails 122a, 122b receive the hay bale 104 from the loader assembly 200. The rails 122a, 122b hold the hay bale 104 away from and above, relative to the ground 110, the frame 102.

The rails 122a, 122b allow the hay bale 104 to slide between the first end 106 and the second end 108 of the vehicle 100 when pushed by the storage assembly 230 and/or the unloader assembly 300. The storage assembly 230 can move the hay bale 104 from the first end 106 to the second end 108 in the direction of arrow 124. The unloader sled can move the hay bale 104 from the second end 108 to the first end 106 in the direction of arrow 126.

The rails 122a, 122b can be shaped to allow the hay bale 104 to slide along them. For example, the rails 122a, 122b can have a circular cross-section (shown in FIG. 2B). Alternatively, or in addition, one or more of the rails 122a, 122b can have a square, triangular, L-shaped, or oval cross-section.

Figure 2A:
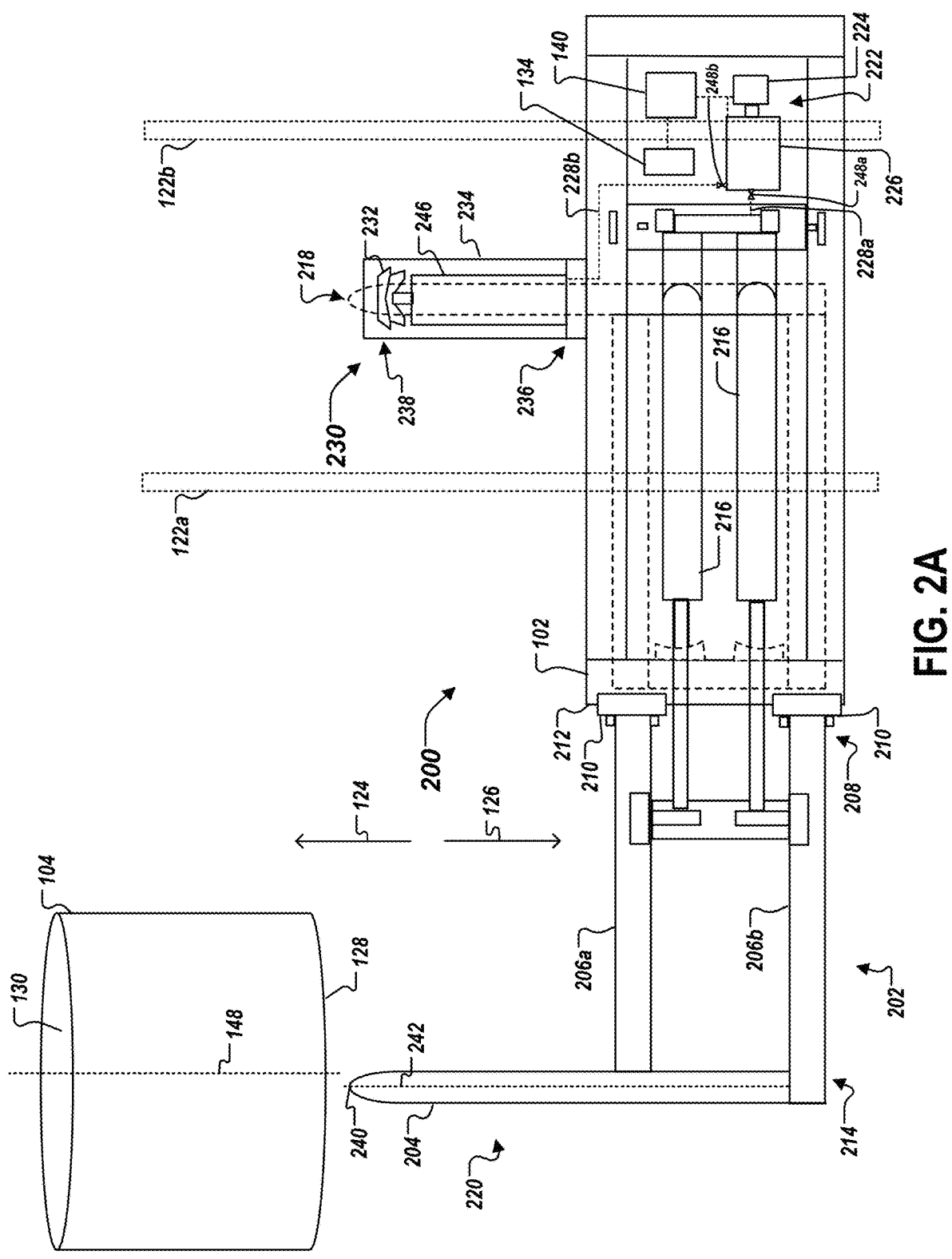
FIG. 2A shows a top view of the loader assembly and storage assembly of FIG. 1.
Figure 2B:
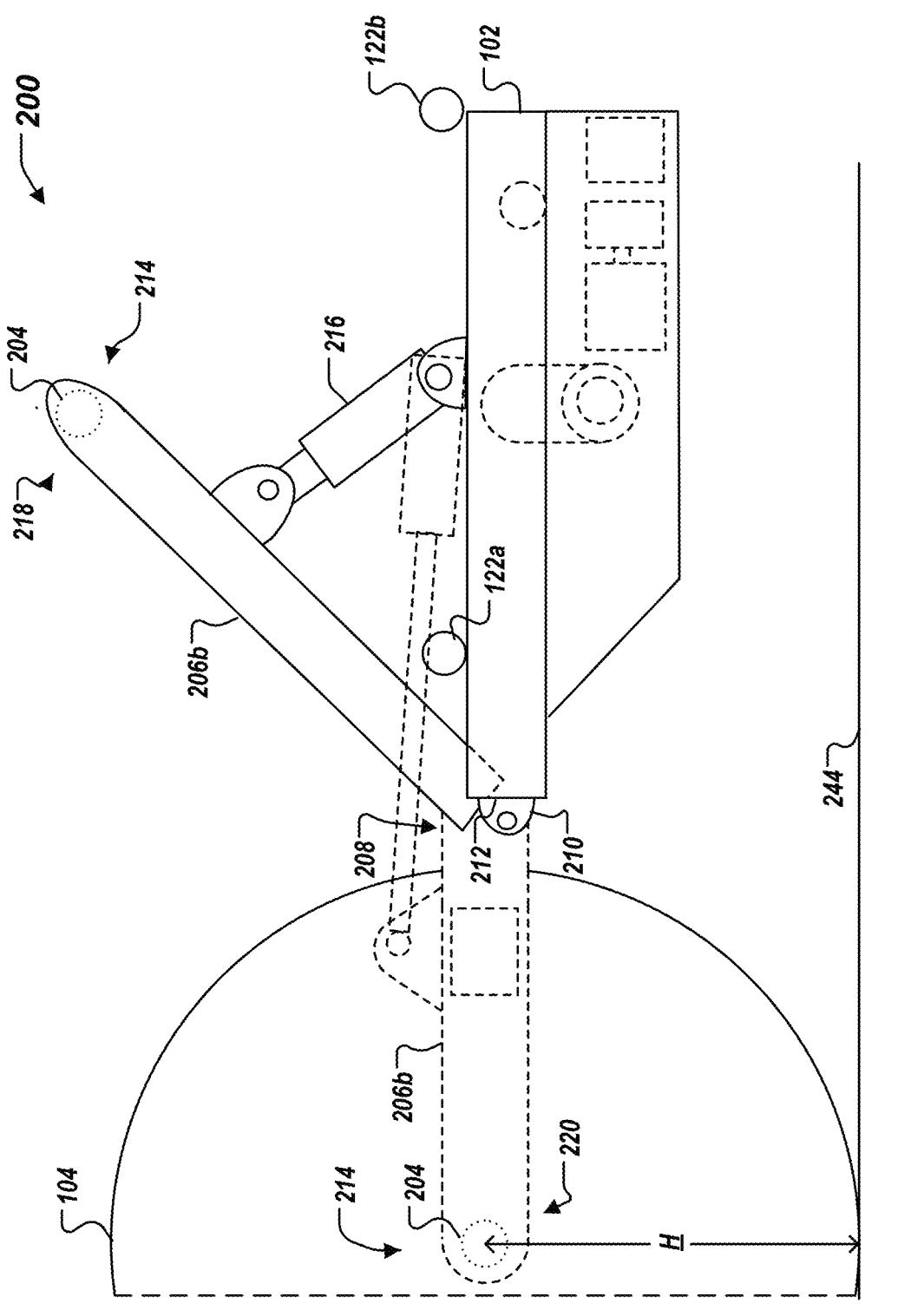
FIG. 2B shows a rear view of the loader assembly and storage assembly of FIG. 1.

FIGS. 2A and 2B are top and rear views of the loader assembly 200 and storage assembly 230. Referring to FIGS. 1, 2A, and 2B, the loader assembly 200 loads the hay bale 104 from the ground onto the vehicle 100 and moves the hay bale 104 along the vehicle 100. The loader assembly 200 is coupled to the frame 102 on the first end 106 (i.e., the back end or the rear end) of the frame 102. The loader assembly 200 has a loader arm 202 with a spike 204 to spear the hay bale 104 as the vehicle 100 moves past. Once speared, the loader arm 202 can pivot to load the hay bale 104 onto the rails 122a, 122b.

The loader arm 202 has a first member 206a and a second member 206b. Both the first member 206a and the second member 206b have a loader arm-first end 208 rotatably coupled to the frame 102 by a pivot joint 210. In some cases, the pivot joint 210 is positioned on a side edge 212 of the trailer frame 102. In such cases, the loader arm 202 rotates relative to the side edge 212 of the frame 102, generally, orthogonal to a direction of forward movement (corresponding to the direction of arrow 124) of the vehicle 100. The first and second members 206a, 206b have a loader arm-second end 214. The spike 204 is coupled to the loader arm-second end 214 of the first and second members 206*a*, 206*b*. The spike 204 extends outwards from the loader arm-second end 214 in the direction of arrow 124 and, generally, orthogonal to the loader arm 202.

The loader assembly 200 includes one or more hydraulic cylinders 216 coupled to and extending between the frame 102 and the loader arm 202. The hydraulic cylinders 216 operate to move the loader arm 202 between a retracted position 218 and an extended position 220. When in the extended position 220, the loader arm 202 extends outside the frame 102 with the spike 204 oriented parallel to the frame 102. When the hay bale 104 is on the spike 204 and the loader arm 202 is manipulated from the extended position 220 to the retracted position 218, the loader arm 202 places the hay bale 104 on the rails 122*a*, 122*b*.

The loader assembly 200 includes a hydraulic sub-system 222 to operate the hydraulic cylinders 216. The hydraulic sub-system 222 can also be operably coupled to the storage assembly 230. The hydraulic sub-system 222 includes a hydraulic fluid reservoir 224, a hydraulic pump 226, and hydraulic conduits 228*a*, 228*b*. The hydraulic fluid reservoir 224 stores a volume of hydraulic fluid and supplies the hydraulic fluid to the hydraulic pump 226. The hydraulic pump 226 is coupled to the hydraulic fluid reservoir 224 and flows the hydraulic fluid to and from the hydraulic cylinders 216 to manipulate the loader arm 202.

The hydraulic conduits 228*a*, 228*b* conduct the hydraulic fluid from the hydraulic pump 226 to various components. Hydraulic conduit 228*a* conducts the hydraulic fluid from the hydraulic pump 226 to the loader assembly 200 to operate the loader arm 202. Hydraulic conduit 228*b* conducts the hydraulic fluid from the hydraulic pump 226 to the storage assembly 230 to operate the storage assembly 230.

The hydraulic sub-system 222 includes hydraulic control valves 248*a*, 248*b* positioned in the hydraulic conduits 228*a*, 228*b*, respectively, to control flow of the hydraulic fluid from the hydraulic pump 226 through the hydraulic conduits 228*a*, 228*b*. The hydraulic control valves 248*a*, 248*b* can be operated manually by the operator or remotely (e.g., by a control system 136 of the vehicle 100).

The storage assembly 230 is mounted to the frame 102 and coupled to the loader assembly 200. The storage assembly 230 removes the hay bale 104 from the loader assembly 200. The storage assembly 230 moves the hay bale 104 along the vehicle 100 from the first end 106 to the second end 108 in the direction of arrow 124. The storage assembly 230 is mounted to the frame 102 and positioned relative to the loader assembly 200 such that the storage assembly 230 conveys the hay bale 104 off the spike 204 when the loader arm 202 is in the retracted position 218 and the hay bale 104 is on the spike 204.

The storage assembly 230 has a storage plate 232 which slides in a bracket 234 along a path between a storage plate-first position 236 and a storage plate-second position 238 alongside the loader assembly 200 in the direction of arrow 124 and in the direction of arrow 126. The storage plate 232 engages a rear surface 128 of the hay bale 104 and applies a force to the hay bale 104 to remove the hay bale 104 from the spike 204 as the storage plate 232 moves from the storage plate-first position 236 to the storage plate-second position 238. The storage plate 232 removes the hay bale 104 from the spike 204 as the storage plate 232 is conveyed along the path in the direction of arrow 124 with the loader arm 202 in the retracted position 218. After the hay bale 104 is removed from the spike 204, the storage plate 232 retracts from the storage plate-second position 238 to the storage plate-first position 236. With the storage plate 232 returned to the storage plate-first position 236, the storage assembly 230 is arranged to receive another hay bale 104 (a second hay bale 146) and remove the second hay bale 146 from the spike 204 in the same manner. The storage assembly 230 can move both hay bales 104, 146 along the rails 122*a*, 122*b*, by pushing the second hay bale 146 against the first hay bale 104. The storage plate 232 has a length and width sufficient to engage the rear surface 128 of the hay bale 104 and transfer sufficient force from the storage assembly 230 to the hay bale 104 to remove it from the spike 204 without damaging the bale.

The storage assembly 230 includes another hydraulic cylinder 246 coupled to the bracket 234 and the storage plate 232. The hydraulic cylinder 246 of the storage assembly 230 is operable to move the storage plate 232 along the bracket 234 between the storage plate-first position 236 to the storage plate-second position 238. The hydraulic cylinder 246 of the storage assembly 230 is fluidly coupled to the hydraulic sub-system 222 by another hydraulic conduit 228.

Figures 3A, 3B:
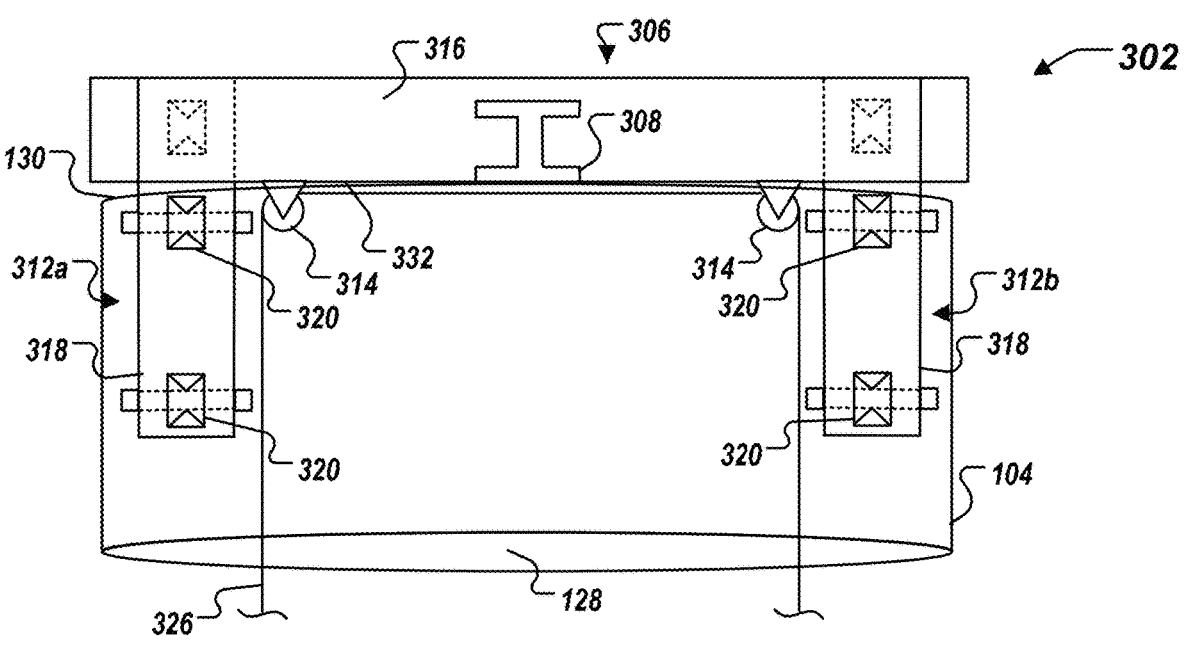
FIG. 3A shows a top view of an unloader sled of the unloader assembly of FIG. 1.
FIG. 3B shows a rear view of the unloader sled of FIG. 3A.
Figure 3C:
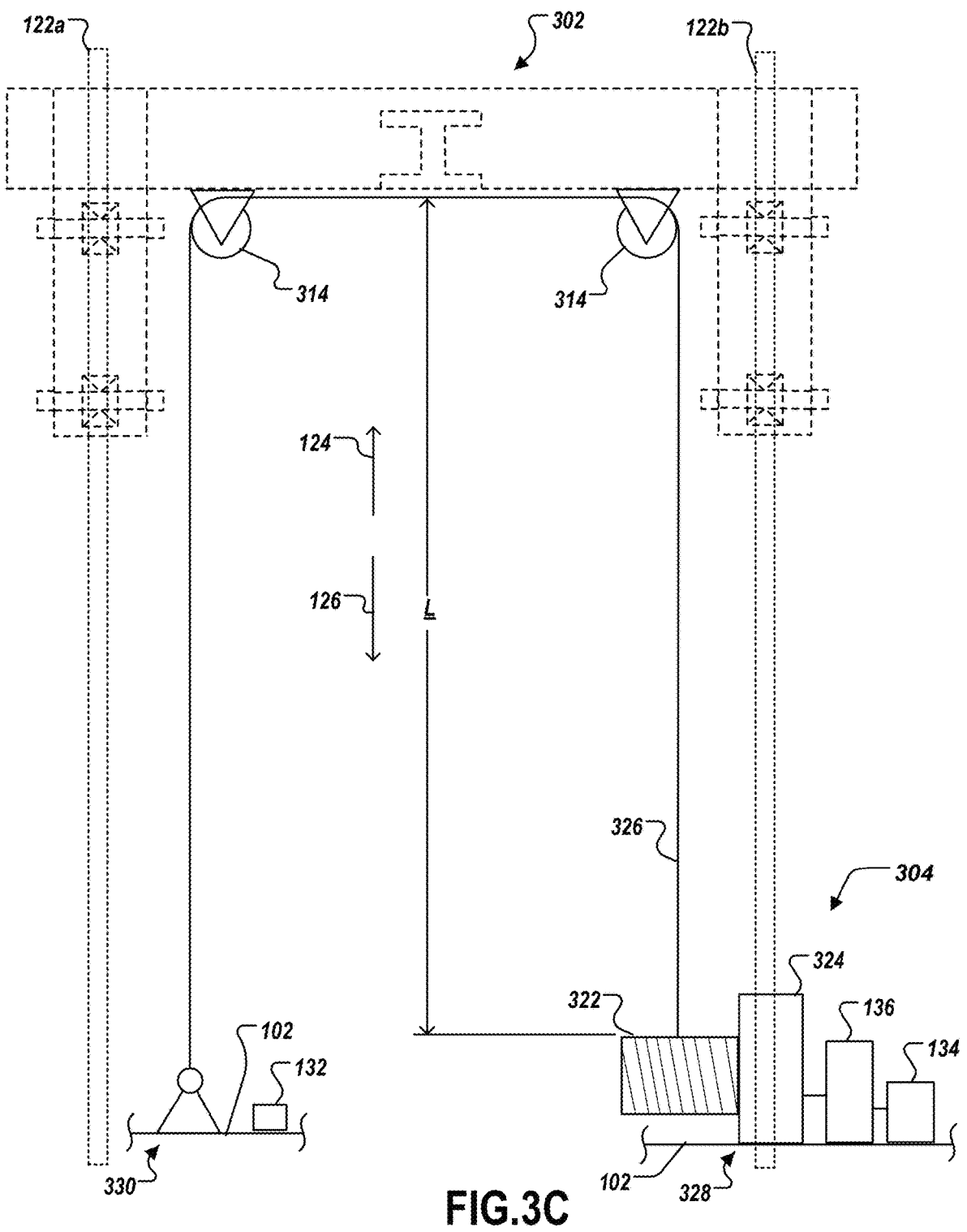
FIG. 3C shows a top view of the unloader assembly of FIG. 1.

FIG. 3A shows a top view of an unloader sled 302 of the unloader assembly 300 of FIG. 1. FIG. 3B shows a rear view of the unloader sled 302. FIG. 3C shows a top view of the unloader assembly 300. Referring to FIGS. 1 and 3A-3C, the unloader assembly 300 is coupled to the frame 102 on the second end 108 of the frame 102. The unloader assembly 300 slides from the second end 108 to the first end 106 to unload the hay bale 104 onto the ground from the vehicle 100. The unloader assembly 300 includes the unloader sled 302 (shown in FIGS. 1, 3A, and 3B) and a winch 304 (shown in FIGS. 1 and 3C) to move the unloader sled 302 relative to the frame 102.

The unloader sled 302 includes an unloader bar 306 extending between the rails 122*a*, 122*b*, an unloader arm 308, rail wheels 312*a*, 312*b*, and pulleys 314. The unloader arm 308 is coupled to and extends upward from the unloader bar 306 to engage the hay bale 104. Two sets of rail wheels 312*a*, 312*b* are coupled to the unloader bar 306. The wheels 312*a*, 312*b* engage the rails 122*a*, 122*b* and allow the unloader bar 306 to move along the rails 122*a*, 122*b*. The pulleys 314 are coupled to the unloader bar 306. The pulleys 314 direct a cable 326 (discussed below) from the winch 304 along the unloader bar 306 and to an anchor point on the vehicle 100. The winch 304 moves the unloader sled 302 along the rails 122*a*, 122*b* to unload the hay bale 104 from the vehicle 100 by retracting the cable 326.

The unloader arm 308 extends from a top surface 316 the unloader bar 306 in the direction of arrow 310 (shown in FIG. 3B) to engage a forward surface 130 of the hay bale 104. When the unloader sled 302 is pulled along the rails 122*a*, 122*b* by the winch 304, the unloader arm 308 applies a force to the forward surface 130 of the hay bale. Applying the force to the forward surface 130 of the hay bale 104 moves the hay bale 104 from the second end 108 to the first end 106 in the direction of arrow 126 along the rails 122*a*, 122*b*. In some cases, the unloader arm 308 can remove the hay bale 104 from the rails 122*a*, 122*b* and deposit the hay bale 104 on the ground 110 as the hay bale 104 moves past the first end 106 in the direction of arrow 126. As shown in FIG. 3A, the unloader arm 308 has an I-shaped cross-section. However, the unloader arm 308 can have a cross-section of another shape. For example, the cross-section of the unloader arm 308 can be square, circular, rectangular, or triangular. In some cases, the unloader arm 308 includes multiple arms or a frame extending from the top surface 316 of the unloader bar 306.

Each set of rail wheels 312a, 312b is coupled to a respective bracket 318 extending from a rear face 332 of the unloader bar 306. The brackets 318 position the respective set of rail wheels 312a, 312b in contact with one of the rails 122a or 122b. As the winch 304 pulls the unloader sled 302 in the direction of arrow 126, the rail wheels 312a, 312b rotate and the unloader sled 302 moves along the rails 122a, 122b in the direction of arrow 126 to move the hay bale 104 along the rails 122a, 122b in the direction of arrow 126. Referring to FIG. 1, the vehicle 100 includes a stop 132 to halt movement of the unloader assembly 300 in the direction of arrow 126 when the unloader assembly 300 is at the first end 106 of the vehicle 100. In the example shown in FIGS. 3A and 3B, each set of rail wheels 312a, 312b include four wheels 320 arranged about (boxing in) the respective rail 122a or 122b to allow movement of the unloader sled 302 in the direction of arrows 124 and 126, but not in other directions. In some implementations, each set of rail wheels 312a, 312b can include more or fewer wheels 320. For example, each set of rail wheels 312a, 312b can include two, three, five, six, or eight wheels 320. In some arrangements, more or less wheels 320 can be above the rails 122a, 122b than below the rails 122a, 122b.

One or more pulleys 314 are coupled to the rear face 332 of the unloader bar 306. The pulleys 314 are rotated by the cable 326 extending from the winch 304. As the winch 304 operates, the pulleys 314 rotate, allowing the winch 304 to pull the unloader sled 302 in the direction of arrow 126. When the forward surface 130 of the hay bale 104 is in contact with the unloader arm 308 and the winch 304 is operated, the hay bale 104 slides along the rails 122a, 122b in the direction of arrow 126. When the unloader sled 302 reaches the first end 106 and contacts the stop 132, the hay bale 104 falls off of the rails 122a, 122b to the ground 110.

Referring to FIGS. 1 and 3A-3C, the winch 304 includes a drum 322 powered by a motor 324. The cable 326 is spooled around and extends from the drum 322. The cable 326 is coupled to the unloader sled 302 through the pulleys 314. The winch 304 rotates the drum 322 to adjust a length L of the cable 326. As the cable 326 is retracted, it pulls the unloader sled 302 along the rails 122a, 122b in the direction of arrow 126, which in turn pushes the hay bale 104 towards the first end 106 of the vehicle 100 to remove the hay bale 104 from the vehicle 100.

The winch 304 is coupled to the frame 102 at a first location 328. The cable 326 is wrapped around the drum 322. The cable 326 extends from the drum 322 of the winch 304 through the pulleys 314 to a second location 330 on the frame 102. Rotating the drum 322 in a first direction, for example, clockwise, decreases the length L of the cable 326, pulling the unloader sled 302 in the direction of arrow 126. When the unloader arm 308 is engaged to the hay bale 104, decreasing the length L of the cable 326 moves the hay bale 104 along the rails 122a, 122b in the direction of arrow 126. Rotating the drum 322 in a second direction opposite the first direction, for example, counterclockwise, increases the length L of the cable 326. The drum 322 can disconnected from the motor 324 to allow the drum 322 to freewheel. That is, when a force is applied to the unloader arm 308 in the direction of arrow 124, the length L of the cable 326 increases. The force can be applied to the unloader arm 308 by the hay bale 104 moving along the rails 122a, 122b in the direction of arrow 124 when pushed by the storage assembly 300 during the loading process described above.

In some implementations, the rails 122a, 122b can be configured to unload the hay bales 104 positioned on the rails 122a, 122b. For example, the rails 122a, 122b can rotate about a common axis (not shown) to dump the hay bales 104 of one or both of the sides 212 of the frame 102 of the vehicle 100.

Referring to FIGS. 1, 2A, and 3C, the vehicle 100 includes a power source 134 to provide electrical power to the vehicle 100. The power source 134 supplies power to the hydraulic sub-system 222 to operate the loader assembly 200 and the unloader assembly 300. For example, the power source 134 can flow electricity to the hydraulic pump 226 to flow hydraulic fluid to or from the hydraulic cylinders 216, changed the position of the loader arm 202 and the spike 204. For example, the power source 134 can flow electricity to the motor 324 to rotate the drum 322, moving the unloader sled 302. In some implementations, the power source 134 generates and/or stores electricity. For example, the power source 134 can be an engine with an electrical generator or a battery.

Referring to FIGS. 1, 2A, and 3C, the vehicle 100 includes a control system 136 and a controller 140. In some implementations, the control system 136 includes one or more sensors 138. The sensor 138 can sense a position of the hay bale 104 and transmit a signal representing the position of the hay bale 104 to the controller 140. The controller 140 receives the signal representing the position of the hay bale 104 from the sensor 138. The controller 140 then compares the position of the hay bale 104 to an expected position of the hay bale 104 to obtain a comparison result. Based on the comparison result, the controller 140 operates one or more of the loader assembly 200, the storage assembly 230, and the unloader assembly 300 to alter a location of the hay bale 104. In some cases, operating the vehicle 100 can include positioning the vehicle 100 relative to the hay bale 104, for example, when the vehicle 100 is operating autonomously.

The sensors 138 are coupled to the vehicle 100. For example, the sensors 138 can be positioned on one or more of the loader assembly 200, the storage assembly 230, and/or the unloader assembly 300. The sensors 138 can be positioned on the frame 102. In some implementations, one or more of the sensors 138 can be positioned in or on the spike 204 and contact the hay bale 104.

The sensor 138 detects the position of the hay bale 104. The position of the hay bale 104 can include one or more of a location of the hay bale 104 positioned relative to the vehicle 100, an orientation of the hay bale 104 relative to the vehicle 100 (i.e., an angle of a center axis of the hay bale 104 relative to the side edge 212 of the frame 102), a size of the hay bale 104, a volume of the hay bale 104, a dimension of the hay bale 104 ((i.e., the length 112 or the diameter 114), a density of the hay bale 104 (i.e., lbs/ft$^3$), a relative movement of the hay bale 104 (i.e., a movement vector 142 of the vehicle 100 relative to the hay bale 104), a direction (the angle component of the movement vector 142) from the spike 204 to a center 144 of the hay bale 104, a distance (the length component of the movement vector 142) from a point 240 of the spike 204 to the center 144 of the hay bale 104, a count of hay bales 104 positioned on the rails 122a, 122b, a position of the hay bales 104 on the rails 122a, 122b, or a geographic location of the hay bale 104 (i.e., a satellite or cellular network derived position).

The expected position can include one or more of an expected (or planned) location of the hay bale 104 relative to the vehicle 100, an expected orientation of the hay bale 104 relative to the vehicle 100 (i.e., an angle of a center axis of the hay bale 104 relative to the side edge 212 of the frame 102), an expected size of the hay bale 104, an expected volume of the hay bale 104, an expected dimension of the hay bale 104 ((i.e., the length 112 or the diameter 114), an expected density of the hay bale 104 (i.e., lbs/ft³), The expected position can also include one or more of an expected relative movement of the hay bale 104 (i.e., a movement vector 142 of the vehicle 100 relative to the hay bale 104), an expected direction (the angle component of the movement vector 142) from the spike 204 to a center 144 of the hay bale 104, an expected distance (the length component of the movement vector 142) from a point 240 of the spike 204 to the center 144 of the hay bale 104, an expected count of hay bales 104 positioned on the rails 122a, 122b, an expected position of the hay bales 104 on the rails 122a, 122b, an expected geographic location of the hay bale 104 (i.e., a satellite or cellular network derived position), a planned location or series of locations in the field or pasture to unload the hay bale 104.

The sensor 138 can be one or more of a camera, an ultrasonic transceiver, a proximity switch, a limit switch, an infrared detector, a motion sensor, a location sensor, or a weight sensor. The sensor 138 can be wired directly to or in wireless communication with the controller 140.

In some cases, the sensor 138 can detect a condition of the hay bale 104. The condition of the hay bale 104 can be a quality (percentage rot or presence of a chemical or contaminant), a quantity of mold, or a temperature of the hay bale 104. The sensor 138 can be a mold probe, an optical camera, or a thermometer. In such cases, the sensor 138 can detect mold present from decomposition of the hay bale 104 or a chemical in the hay bale 104, sense a composition of the hay bale (i.e., the type of grass or weed contained in the hay bale 104 or the degree of rot of the hay bale 104), or sense a temperature of the hay bale 104 relative to the environment. The expected condition of the hay bale 104 can be an expected composition of the hay bale 104 (i.e., the type of grass or weed contained in the hay bale 104 or an expected degree of rot or decomposition), an expected temperature the degree of rot, or an expected mold concentration of the hay bale 104).

The controller 140 can include various forms of digital computers, such as printed circuit boards (PCB), processors, digital circuitry, or otherwise parts of a fracture geometry mapping system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 140 can include a processor, a memory, a storage device, and an input/output device which can be interconnected using a system bus. The processor is capable of processing instructions for execution within the controller 180. The processor may be designed using any of a number of architectures. For example, the processor may be a CISC (Complex Instruction Set Computers) processor, a RISC (Reduced Instruction Set Computer) processor, or a MISC (Minimal Instruction Set Computer) processor.

In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the controller 140. In one implementation, the memory is a computer-readable medium. In one implementation, the memory is a volatile memory unit. In another implementation, the memory is a non-volatile memory unit.

The storage device is capable of providing mass storage for the controller. In one implementation, the storage device is a computer-readable medium. In various different implementations, the storage device may be a floppy disk device, a hard disk device, an optical disk device, or a tape device.

The input/output device provides input/output operations for the controller 140. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

In some implementations, the controller 140 receives the signal representing the position of the hay bale 104 from the sensor 138, compares the position of the hay bale 104 to the expected position of the hay bale 104 to obtain a comparison result. Based on the comparison result, the controller 140 operates the loader assembly 200, the storage assembly 230, and the unloader assembly 300 to alter a location of the hay bale 104.

For example, the sensors 138 detects the position where the center axis 148 of the hay bale 104 is positioned at a 35° angle relative to the side edge 212 of the frame 102 and send a signal representing the 35° orientation of the hay bale 104 to the controller 140. In this example, the expected orientation of the hay bale 104 the center axis 148 being parallel to the vehicle 100. The controller 140 compares the 35° angle to the expected parallel orientation and obtains a comparison result indicated that the spike 204 is 35° off relative to the center axis 148 of the hay bale 104. The controller 140 then generates a command signal to the vehicle 100 to change the orientation of the vehicle 100 to align the spike 204 with the center axis 148 of the hay bale 104, such as changed direction of wheels (e.g., wheels 118 or wheels of the truck pulling the trailer) as the vehicle 100 moves in the direction (direction of arrow 124) toward the hay bale 104.

In another example, the sensors 138 detects the height of the center axis 148 of the hay bale 104 from the ground 110 at a first time. The sensors 138 transmit a signal of the height of the center axis 148 of the hay bale 104 to the controller 140. In this example, the expected position is the expected height of the center axis 148. The controller 140 compares the received height of the center axis 148 to the expected height of the center axis 148 to obtain a comparison result. Responsive to the comparison result indicating the actual height of the center axis 148 of the hay bale 104 is less than the expected height of the center axis 148 of the hay bale 104 (the expected position), the controller can generate a command signal to lower the spike 204. The command signal can direct the hydraulic control valve 248a to open and the hydraulic pump 226 to energize, flowing hydraulic fluid from the hydraulic reservoir 224 into the hydraulic pump 226, pressurize the hydraulic fluid, flow the pressurized hydraulic fluid through the hydraulic control valve 248a into the hydraulic conduit 228a to the hydraulic cylinders 216. Flowing the hydraulic fluid to the hydraulic cylinders 216 actuates the loader arm 202 from the retracted position 218 to the extended position 220. In some cases, the extended position 220 can position the spike 204 at the expected height of the center axis 148 of the hay bale. Responsive to the comparison result indicating the actual height of the center axis 148 of the hay bale 104 is less than the expected height of the center axis 148 of the hay bale 104, the command signal can raise or lower the spike 204 relative to the ground 110 to place the spike 204 at the actual height of the center axis 148 of the hay bale 104. The comparison result then indicates the spike 204 is at the actual height of the center axis 148 of the hay bale. Responsive to the comparison result indicating the spike 204 is at the actual height of the center axis 148 of the hay bale 104, the controller 140 can send another command signal to the hydraulic control valve 228 to shut, maintain the height of the spike 204 relative to the ground 110, and securing the hydraulic pump 226.

In yet another example, the sensors 138 detect a position indicates the position of the point (tip) 240 of the spike after point 240 of the spike 204 passes through the hay bale 104 and exits the front surface 130 of the hay bale 104 in the direction of arrow 124. In this example, the expected position is that the spike 204 has fully passed through the hay bale 104 and is fully engaged to the hay bale 104. The controller 140 compares the position of the hay bale 104 (fully engaged to the spike 204) to the expected position (expecting the spike 204 to be fully engaged to the hay bale 104) to obtain the comparison result that the spike 204 is actually fully engaged to the hay bale 104. Responsive to the comparison result indicating the spike 204 is fully engaged to the hay bale 104, the controller 140 transmits a command signal to the loader assembly 200 to load the hay bale 104 onto the rails 122a, 122b. The command signal can command the hydraulic control valve 248a to actuate from a closed position to an open position and the hydraulic pump 226 to energize and flow hydraulic fluid from the hydraulic cylinders 216 through the hydraulic conduit 228a to the hydraulic reservoir 224, moving the loader arm 202 from the extended position 220 to the retracted position 218 with the hay bale 104 on the spike 204, placing the hay bale 104 on the rails 122a, 122b. Responsive to the comparison result indicating the hay bale 104 is positioned on the rails 122a, 122b, the controller 140 controller 140 can send a command signal to shut the hydraulic control valve 228a. In some cases, the hydraulic conduit 228a can flow hydraulic to either side of a piston (not shown) of the hydraulic cylinder 216 to operate the hydraulic cylinder 216 to position the loader arm 202 between the retracted position 218 and the extended position 220.

The controller 140 can be programmed to operate the loader assembly 200 based on any one or more of the comparison results between the position of the hay bale 104 and the respective expected position. The command signals generated by the controller 140 and transmitted to the hydraulic sub-system 222 can operate the loader system 200 by, when the loader arm 202 is in the retracted position, opening the hydraulic control valve 228a and flowing hydraulic fluid from the hydraulic reservoir 224 by the hydraulic pump 226 to the hydraulic pistons 216, manipulating the loader arm 202 from the retracted position 218 to the extended position 220. The controller 140 can then generate command signals to change the orientation of the vehicle 100 relative to the orientation of the hay bale 104, aligning a center axis 242 of the spike 204 parallel with a center axis 148 of the hay bale 104. The controller 140 can the generate command signals to open and close the hydraulic valve 228a to flow hydraulic fluid to either side of the piston of the hydraulic cylinder 216, raising or lowering the spike 204 relative to the center axis 148 of the hay bale placing the center axis 148 of the spike 204 at a height H relative to a surface 244 of the Earth at a same height H of the center axis 148 of the hay bale 104 relative to the surface 244 of the Earth. The controller 140 can then generate a command signal to the vehicle to alter the orientation of the vehicle 100 relative to the hay bale 104 to collinearly align the center axis 242 of the spike 204 with the center axis 148 of the hay bale 104. The controller 140 can generate a command signal to the vehicle 100 to move toward the hay bale 104 in the direction of arrow 124, impaling the hay bale 104 with the spike 204. The controller 140 can be programmed to further operate the loader assembly 200 by generating a command signal to the control valve 248*a* to flow hydraulic fluid to the piston of the hydraulic cylinder 216, manipulating the loader arm 202 from the extended position 220 to the retracted position 218 with the hay bale 104 on the spike 204. Manipulating the loader arm 202 to the retracted position 218 with the hay bale 104 on the spike 204 positions the hay bale 104 on the rails 122*a*, 122*b*. The controller 140 can then generate a command signal to the hydraulic control valve 228*a* to shut, maintaining the loader arm 202 in the retracted position 218 and stopping the hydraulic pump 226.

The controller 140 can be programmed to operate the storage assembly 230 based on one or more of the comparison results between the position of the hay bale 104 and the respective expected position. The controller 140 operates the storage assembly 230 by receiving a signal from one or more of the sensors 138 indicating a position of the hay bale 104 in contact with the rails 122*a*, 122*b* and comparing the signal to an expected position. Responsive to the comparison producing a comparison result indicating the hay bale 104 is in contact with the rails 122*a*, 122*b* and the loader arm 202 is in the retracted position 218, the controller 140 generates a command signal to the control valve 248*b* to open, allowing hydraulic fluid to flow to one side of a piston (not shown) the hydraulic cylinder 246 to convey the storage plate 232 along the path relative to the loader assembly 200 in the first direction (in the direction of arrow 124), contacting the storage plate 232 to the hay bale 104 and conveying the storage plate 232 and the hay bale 104 along the path relative to the loader assembly 200 in the first direction (the direction of arrow 124). Responsive to the hay bale 104 moving past the first end 106 of the vehicle 100, the hay bale 104 is removed from the spike 204 in the first direction (arrow 124).

The controller 140 can then compare the position of the hay bale 104 with an expected position indicating the hay bale 104 is in contact with the rails 122*a*, 122*b* and the hay bale 104 is no longer in contact with the spike 204 (e.g., the hay bale 104 has been removed from the spike 204 and moved along the rails 122*a*, 122*b* in the direction of arrow 124). Responsive to the comparison result indicating the hay bale 104 has been removed from the spike 204, the controller 140 can generate a command signal to the hydraulic control valve 248*b* to flow hydraulic fluid to another side of the piston of the hydraulic cylinder 246, conveying the storage plate 232 along the path relative to the loader assembly 200 in the second direction (in the direction of arrow 126), disengaging the storage plate 232 from the hay bale 104 which conveys the storage plate 232 along the path relative to the loader assembly 200 in the second direction (the direction of arrow 126) from the storage plate-second position 238 to the storage plate-first position 236. The controller 140 can then generate a command signal to the hydraulic control valve 248*b* to shut, stopping flow of hydraulic fluid through conduit 228*b*.

The controller 140 can be programmed to further operate the storage assembly 230, such as when the hay bale 104 is a first hay bale 104 is on the rails 122*a*, 122*b* and the second hay bale 146 is positioned relative to the vehicle 100 and the position of the hay bale is the sensors 138 detecting the second hay bale 146 on the ground 110. For example, the controller 140 generates the command signals as described above to load the second hay bale 146. Loading the second hay bale 146 can be accomplished by the controller 140 by one or more of the sensors 138 detecting a position of the second hay bale 146 in contact with the rails 122*a*, 122*b*, transmitting the signal to the controller 140. The controller 140 then compares the signal to the expected position (Is the second hay bale 146 in contact with the rails 122*a*, 122*b*, the loader arm 202 in the retracted position 218, and the first hay bale 104 in contact with the rails 122*a*, 122*b*). Responsive to the comparison producing a comparison result indicating the second hay bale 146 is in contact with the rails 122*a*, 122*b* and the loader arm 202 is in the retracted position 218, the controller 140 generates a command signal to the hydraulic control valve 248*b* to open, allowing hydraulic fluid to flow to one side of a piston of the hydraulic cylinder 246 to convey the storage plate 232 along the path relative to the loader assembly 200 in the first direction (direction of arrow 124) and contacting the storage plate 232 to the second hay bale 146. As the storage plate 232 and the second hay bale 146 can be conveyed along the path relative to the loader assembly 200 in the first direction (the direction of arrow 124) until the second bale 146 contacts the first hay bale 104. When the storage plate 232 continues to move in the first direction (direction of arrow 124), the second hay bale 146 is removed from the spike 204 and both the first hay bale 104 and the second hay bale 146 move in the first direction (the direction of arrow 124) along the rails 122*a*, 122*b*.

The controller 140 can be programmed to operate the unloader assembly 300 based on one or more of the comparison results between the position of the hay bale 104 and the respective expected position. For example, the sensors 138 can detect the position of the detected (actual) geographic location (i.e., a GPS coordinate) of the vehicle 100 and transmit a signal representing the geographic location of the vehicle 100 to the controller 140. The controller 140 receives the geographic location signal and compares the detected geographic location to an expected position such as a pre-planned offload location. In response to obtaining a result comparison indicating the actual geographic location of the vehicle 100 is at the pre-planned offload location, the controller 140 generates a command signal to the unloader assembly 300 to offload one or more hay bales 104 from the vehicle 100 onto the ground 110. The controller 140 can generate a command signal to energize the motor 324 of the winch 304 which rotates the drum 322 and reduces the length L of the cable 326. As the length L of the cable 326 is reduced, the unloader arm 308 and the first and second hay bales 104, 146 are conveyed in the second direction (the direction of arrow 126) opposite the first direction (the direction of arrow 124). Responsive to the length L of the cable 326 reduced less than a threshold length, at least one of the first and second hay bales 104, 146 are removed from the rails 122*a*, 122*b* and onto the ground 110. The comparison result can then indicate that the pre-programmed number of hay bales 104 has been offloaded at the pre-planned geographic location, and the controller 140 transmits a command signal to the motor 324 to stop rotating.

In some cases, the controller 140 is programmed to perform operations including receiving the signal representing a condition of the hay bale 104 from the sensor 138 and operating the vehicle 100 based on the condition of the hay bale 104 by comparing the condition of the hay bale 104 to the stored condition of the hay bale 104 to obtain a comparison result. Based on the comparison result, the controller 140 can direct the vehicle 100 to bypass the hay bale 104 and proceed to the second (next) hay bale 146. For example, if the result of the comparison indicates the hay bale 104 is rotten or contains harmful weed or contaminant, then the controller 140 can send a signal to the vehicle 100 to bypass the rotten hay bale 104 (not load the rotten hay bale 104 onto the vehicle 100) and proceed to another location to load the second hay bale 146. The controller 140 can also send a signal to alert a user or operator of the condition of the hay bale 104.

In some cases, the controller 140 can generate a log and/or a map of the locations of the hay bales collected from the field. The controller 140 can determine the location of each hay bale 104 loaded based on the location of the vehicle 100 and the relative location of the hay bale to the vehicle 100. The controller 140 can then determine the condition of the hay bales 104. Based on determining the position and the condition of one or more hay bales 104 indicating a bad batch of hay bales 104, the controller 140 can determine problem areas of the pasture.

Figure 4:
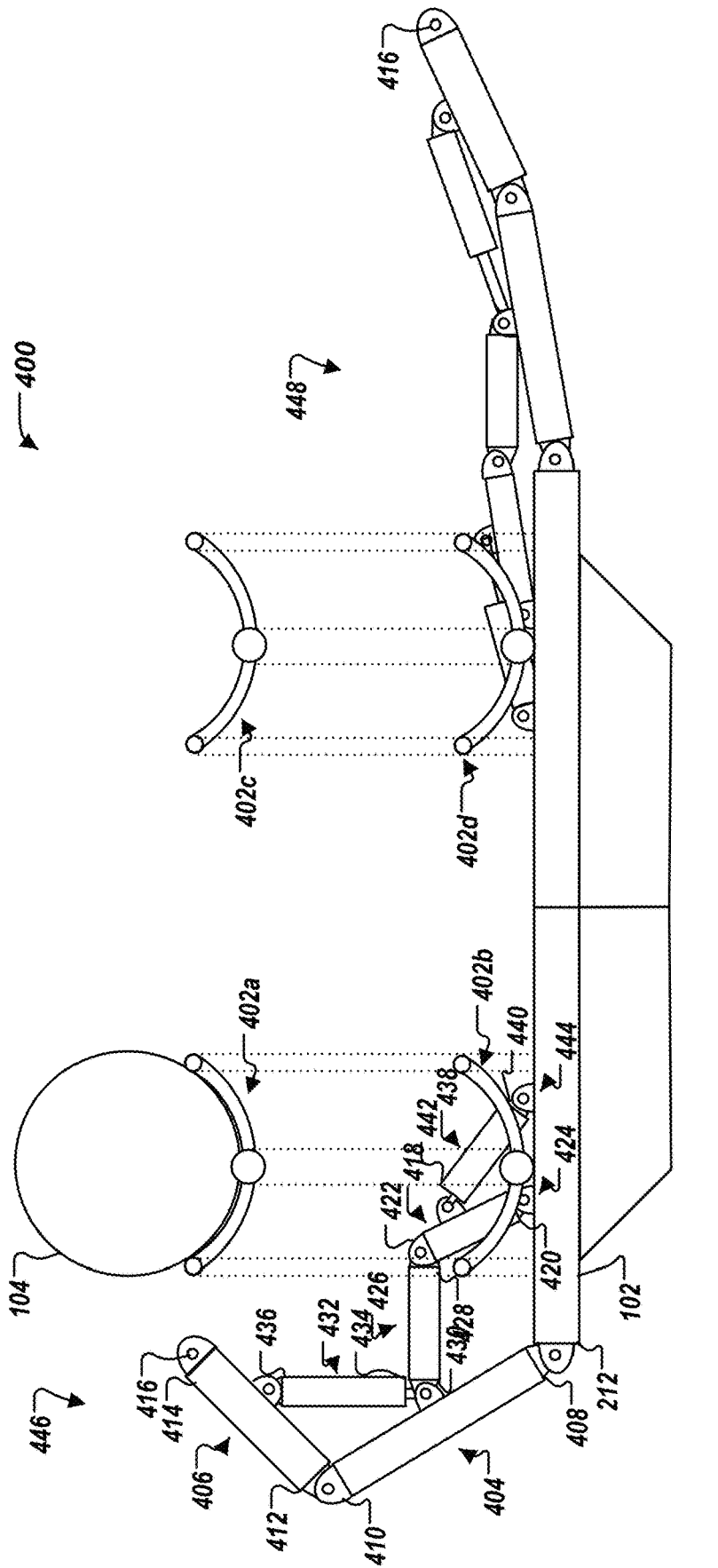
FIG. 4 shows a rear view of another loader assembly.

FIG. 4 is a perspective view of another loader assembly. The loader assembly 400 is generally similar to the loader assembly 200 previously described. The loader assembly 400 can be coupled to the vehicle 100 in place of or in addition to the loader assembly 200. The loader assembly 400 can load the hay bales 104 on rail pairs 402a-d of different heights or locations couple to and relative to the frame 102 the vehicle 100.

The loader assembly 400 assembly has a first member 404 and a second member 406. The first member 404 has a first member-first end 408 coupled to the frame 102 on the side edge 212 and a first member-second end 410 coupled to the second member 406. The second member 406 has a second member-first end 412 rotatably coupled to the first member-second end 410 and a second member-second end 414 coupled to a spike 416 substantially similar to the spike 204 previously described.

The loader assembly 400 has a third member 418 having a third member-first end 420 and a third member-second end 422. The third member-first end 420 is pivotably coupled to the frame 102 inward and at a second location 424 way from the side edge 212.

The loader assembly 400 has a fourth member 426 having a fourth member-first end 428 and a fourth member-second end 430. The fourth member-first end 428 is coupled to the third member 418 at the third member-second end 422. The fourth member-second end 430 is coupled to first member 404 between the first member-first end 408 and the first member-second end 410.

The loader assembly 400 has a first hydraulic cylinder 432 having a first hydraulic cylinder-first end 434 and a first hydraulic cylinder-second end 436. The first hydraulic cylinder-first end 434 is coupled to the first member 404 and the fourth member-second end 430. The first hydraulic cylinder-second end 436 is coupled to the second member 406 between the second member-first end 412 and the second member-second end 414. The first hydraulic cylinder moves the second member 406 relative to the first member 404. The first hydraulic cylinder 432 is operatively coupled to a hydraulic sub-system (not shown) substantially similar to the hydraulic sub-system 222 and controlled by a controller (not shown) substantially similar to the control system 136 described in reference to FIGS. 1-3C.

The loader assembly 400 has second hydraulic cylinder 438 having a second hydraulic cylinder-first end 440 and a second hydraulic cylinder-second end 442. The second hydraulic cylinder-first end 440 is pivotably coupled to the frame 102 at a third location 444 offset from the second location 424. The second hydraulic cylinder-second end 442 is pivotably coupled to the third member 418. The second hydraulic cylinder 438 moves the third member 418 and the fourth member 426 to rotate the first member 404 about the side edge 212 of the frame 102 to extend and retract the spike 416.

The loader assembly 400 moves the spike 416 between a retracted position 446 to load the hay bale 104 on the rail pairs 402a-d and an extended position 448 where the spike 416 is positioned to engage the hay bale 104 when the hay bale 104 is on the ground 110.

In some implementations, the loader assemblies 200 and 400 can unload the hay bale 104 from the vehicle 100. For example, when the spike 204 is in the retracted position 218 and the unloader assembly 300 moves the hay bale 104 toward the loader assembly 200, the hay bale 104 can be impaled by the spike 204, the loader assembly 200 can then be operated to the extended position 220 placing the hay bale 104 on the ground 110, and the vehicle 100 can move in the direction of arrow 126, removing the hay bale 104 from the spike 204.

In some implementations, the vehicle 100 includes a truck (not shown) to position the vehicle 100. The truck can be human operated, controller assisted, or fully operated by the controller (fully autonomous). In other cases, the vehicle 100 is fixed to a truck chassis, that is, the truck and the vehicle 100 are combined in a single unit.

In some implementations, the loader assembly 200 or 400, the storage assembly 230, and the unloader assembly 300 can each be installed on an existing trailer or truck chassis. Some implementations, a control system generally similar to the control system 136 described in reference to FIGS. 1-3C can operate a hay bale trailer to load or unloading the hay bale 104 from a trailer. Some implementations include a method of loading and unloading the hay bale 104 from the vehicle 100.

Figure 5:
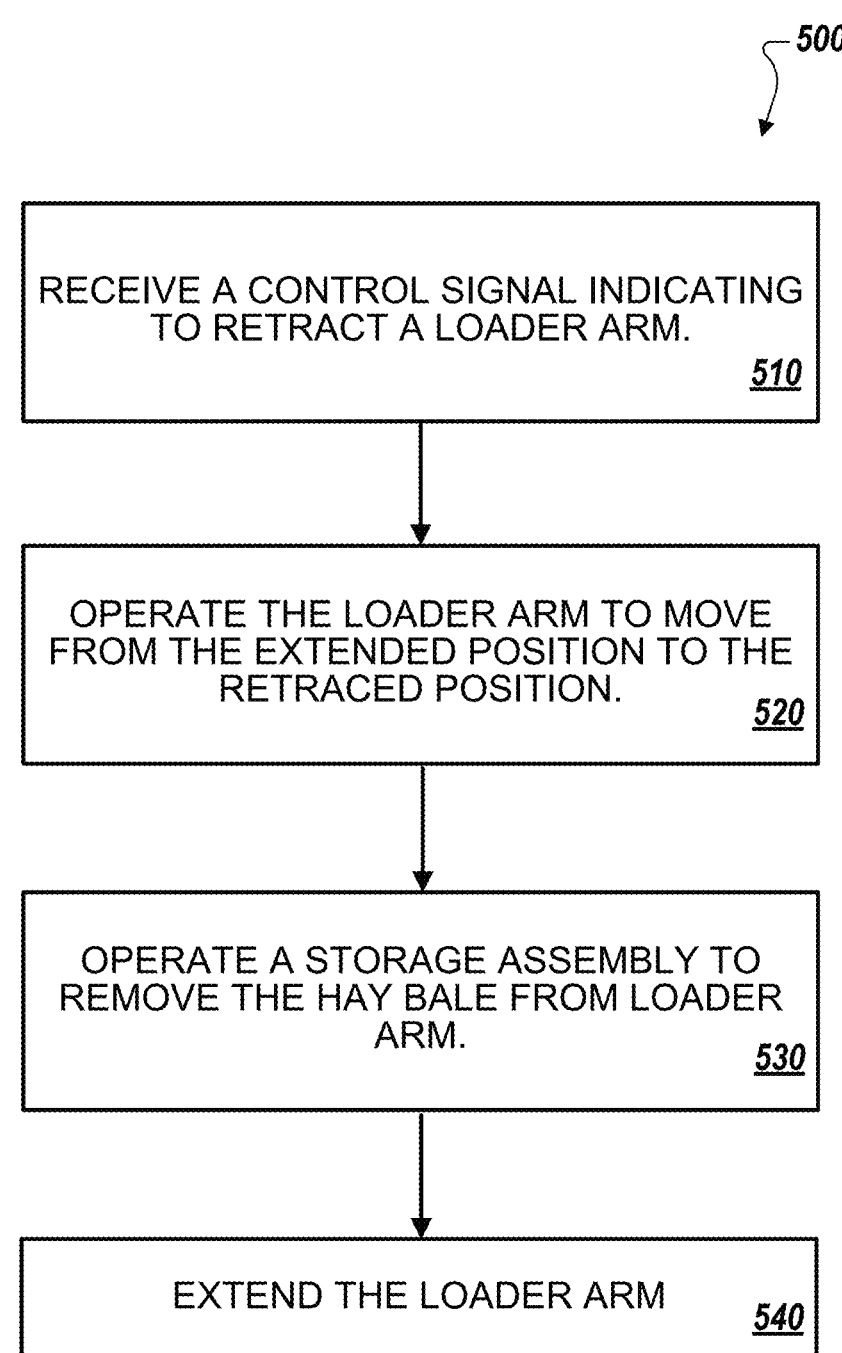
FIG. 5 shows a flow diagram of an example process for controlling a vehicle with a loader assembly, a storage assembly, and an unloader assembly.

FIG. 5 shows a flow diagram of an example process 500 for controlling a vehicle with a loader assembly, a storage assembly, and an unloader assembly. In some implementations, the process 500 can be performed by all or part of the example vehicle 100 of FIGS. 1-3C or the example loader assembly of FIG. 4.

A control system receives a control signal indicating to retract a loader arm (510). For example, when a hay bale is on a spike of the loader arm and the control system is operated manually, the operator can maneuver a lever or push a button of the control system to retract the loader arm. For example, when operated semi-autonomously or autonomously, the controller compares a position of a hay bale relative to the loader arm to an expected position to obtain a comparison result. Based on the comparison result indicating the hay bale is on the spike, the controller transmits a control signal to the control system to retract the loader arm.

The control system operates the loader arm to move from the extended position to the retraced position (520). For example, the control system can actuate a hydraulic control valve open or closed to flow hydraulic fluid to and from a hydraulic cylinder, moving the loader arm from the extended position to the retracted position with the hay bale on the loader arm.

The control system operates a storage assembly to remove the hay bale from the loader arm (530). For example, the operator can actuate another lever or push another button of the control system to open a storage assembly hydraulic control valve to flow hydraulic fluid to a hydraulic cylinder coupled to a storage plate, moving the storage plate into contact with the hay bale and removing the hay bale from the spike. For example, the control system can receive a control signal from the controller to flow hydraulic fluid through the hydraulic control valve to the hydraulic cylinder of the storage assembly, moving a storage plate into contact with the hay bale and sliding the hay bale off the spike onto rails on the vehicle.

The control system extends the loader arm to be positioned to engage another hay bale i.e., in order to repeat the process (540). For example, the controller sends a control signal to the control system to open the hydraulic control valve, flowing hydraulic fluid to the hydraulic cylinder, moving the loader arm from the retracted position to the extended position.

Figure 6A:
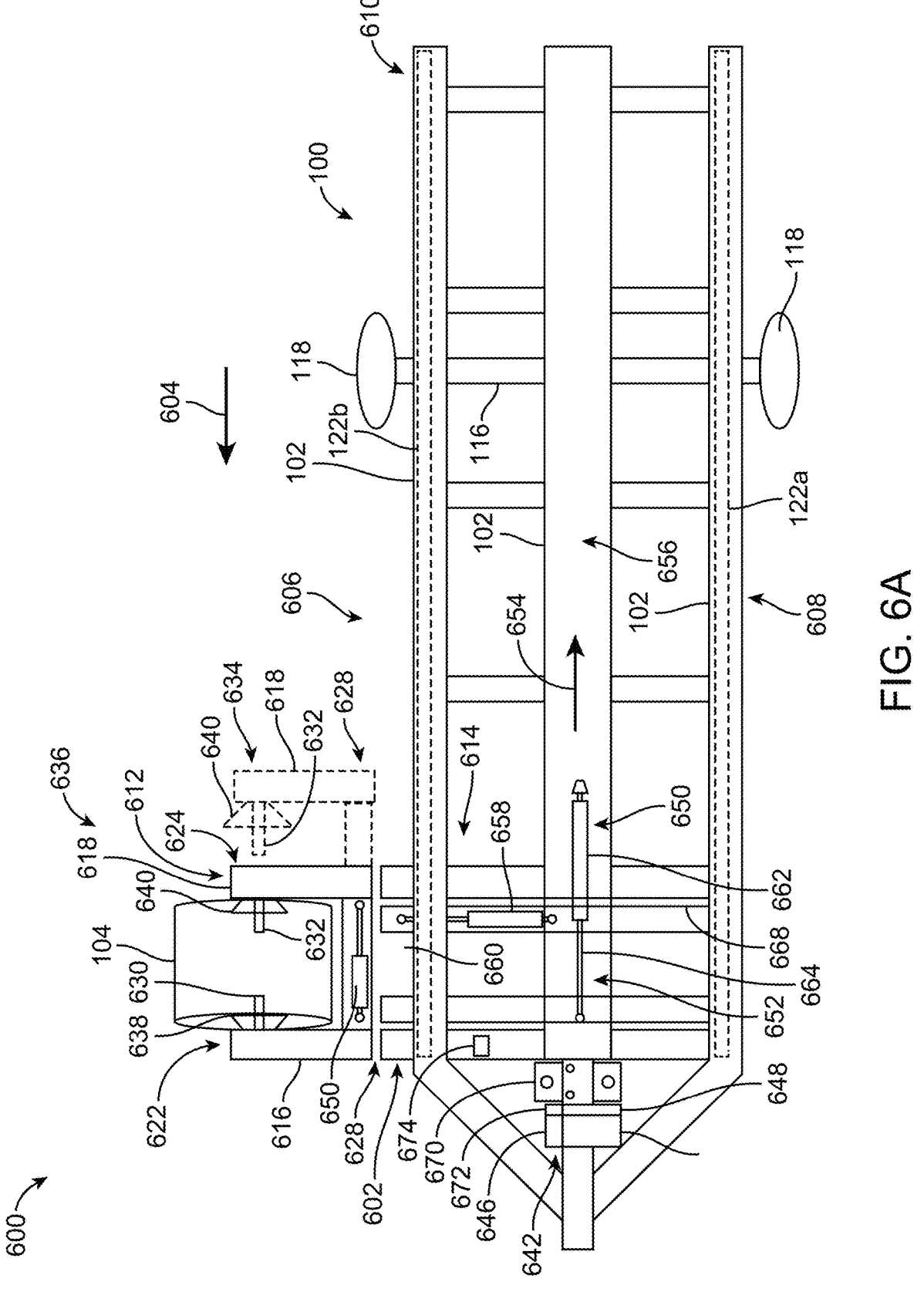
FIG. 6A shows a top view of a side loader assembly on the vehicle of FIG. 1.
Figure 6B:
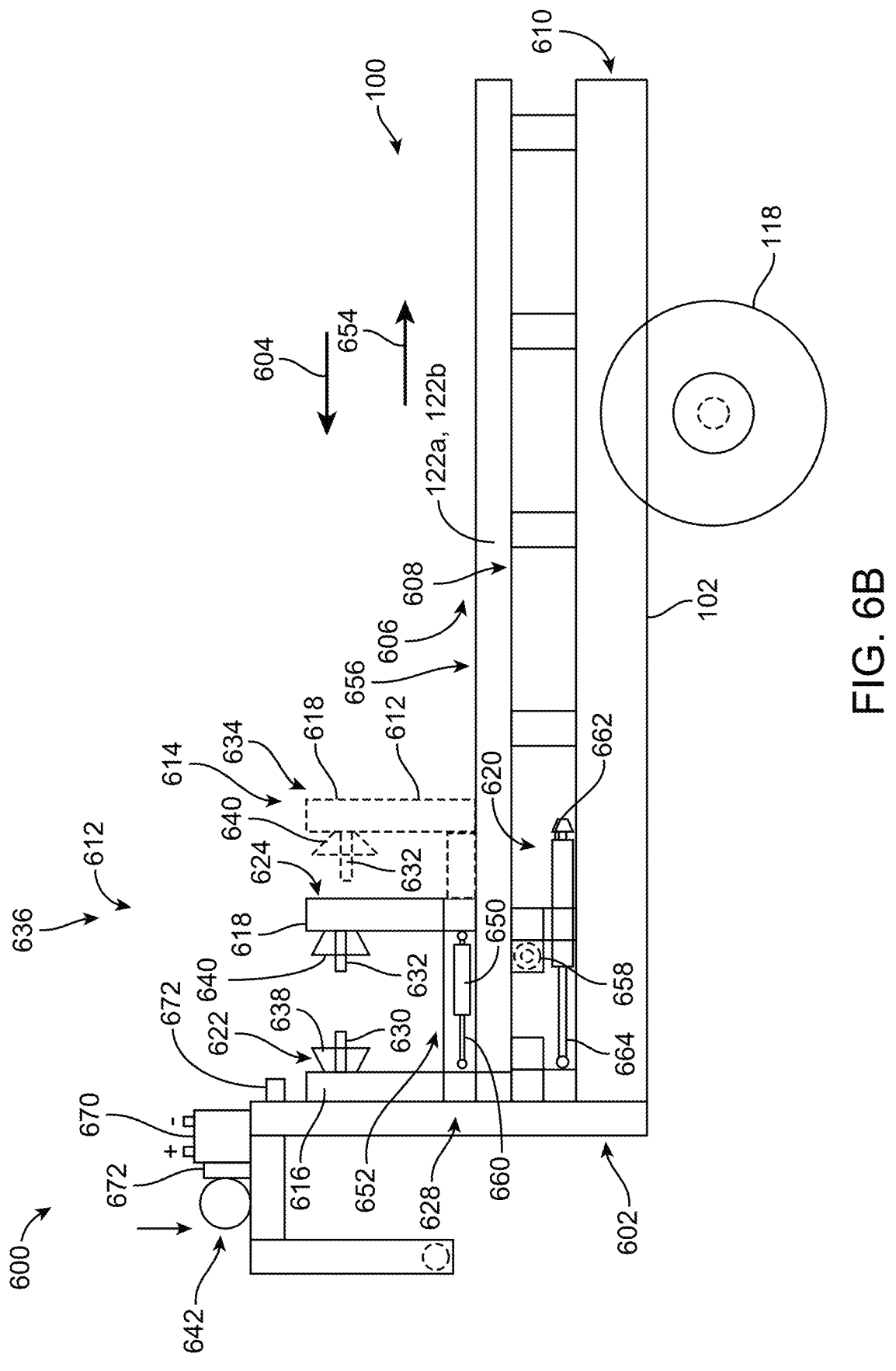
FIG. 6B shows a side view of the squeeze side loader assembly of FIG. 6A.

Referring to FIGS. 6A-6B, in another embodiment, the vehicle 100 can include a side loader mechanism 600 to load one or more hay bales 104 on to the vehicle 100 and a storage assembly 620 to move the hay bales 104 off the side loader mechanism 600 and along the vehicle 100. The frame 102 has a front end 602 perpendicular to the direction of travel of the vehicle 100 as shown by arrow 604, two sides 606, 608 oriented parallel to the direction of travel, and a rear end 610 opposite the front end 602. The two sides 606, 608 extend between the front end 602 and the rear end 610. In this implementation, the side loader mechanism 600 is positioned on the side 606 toward the front end 602 of the vehicle 100. Alternatively, or in addition, one or more side loader mechanisms 600 can be positioned on either or both of the sides 606, 608 at any location between the front end 602 and the rear end 610.

The side loader mechanism 600 is pivotally coupled to the side 606 of the frame 102. The side loader mechanism 600 is pivotable between an extended position 612, as shown in FIG. 6A, and a retracted position 614, shown in FIG. 6B, to load the hay bale 104 on the vehicle 100. In some implementations, the extended position 612 can be referred to as a loading position in which the side loader mechanism 600 is arranged to couple to and engage the hay bale 104. In some implementations, the retracted position 614 can be referred to as a storage position.

The side loader mechanism 600 has a first loader arm 616 and a second loader arm 618 operable to open and close relative to one another to squeeze (i.e., crimp or compress) the hay bale 104. When the first loader arm 616 and the second loader arm 618 squeeze the hay bale 104, the first loader arm 616 and the second loader arm 618 can be operated to reposition the hay bale 104 from the ground 110 to the vehicle 100 by moving the first loader arm 616 and the second loader arm 618 from the extended position 612 to the retracted position 614 in the proximity of the storage assembly 620. The first loader arm 616 and the second loader arm 618 rotate relative to the side 606 of the frame 102 orthogonal to the direction of forward movement (shown by arrow 604) of the vehicle 100.

In this implementation, the second loader arm 618 moves between an engaged position 636 spaced to contact the hay bale 104 and a disengaged position 634 spaced apart from the hay bale 104. In other implementations, the first loader arm 616 can move between an engaged position spaced to contact the hay bale 104 and a disengaged position spaced apart from the hay bale 104. In yet other implementations, both the first loader arm 616 and the second loader arm 618 each have separate engaged positions and disengaged positions, and both the first loader arm 616 and the second loader arm 618 move between the respective engaged position spaced to contact the hay bale 104 and the respective disengaged position spaced apart from the hay bale 104.

The first loader arm 616 and the second loader arm 618 each have distal ends 622, 624, respectively, and proximal ends 626, 628. The proximal ends 626, 628 are opposite the distal ends 622, 624 and are nearer the side 606 of the frame 102 than the distal ends 622, 624 when the loader arms 616, 618 are extended. The first loader arm 616 and the second loader arm 618 extend perpendicular to the side 606 of the frame 102.

In this implementation, each of the first loader arm 616 and the second loader arm 618 have a spike 630, 632, respectively. The spikes 630, 632 are positioned on the distal ends 622, 624. The spikes 630, 632 extend perpendicularly from each of the first loader arm 616 and the second loader arm 618 toward each other. The spikes 630, 632 extend from each of the first loader arm 616 and the second loader arm 618 toward each other parallel to the side 606 of the frame 102. The spikes 630, 632 can pierce the hay bale 104 to couple the hay bale 104 to the first loader arm 616 and the second loader arm 618 when the first loader arm 616 and the second loader arm 618 move from an extended position 634 to an engaged position 636. When the first loader arm 616 and the second loader arm 618 are in the extended position the second loader arm extends outside the frame with the spike oriented parallel to the side of the frame toward the rear end of the vehicle. Although in this implementation both the first loader arm 616 and the second loader arm 618 have a spike 630, 632, in other implementations, only one (i.e., either) or none of the first loader arm 616 and the second loader arm 618 include a spike 630, 632.

In this implementation, the spikes 630, 632 can have a length of between one inch and twenty four inches, however, the spikes 630, 632 can be of any suitable length. In this implementation, the spikes 630, 632 have a diameter of between one half inches and three inches, however, any suitable diameter can be used. The dimensions of the spikes 630, 632 allow the spikes 630, 632 to penetrate the hay bale 104 and support the weight of the hay bale 104 during loading onto the vehicle 100.

In this implementation, each of the first loader arm 616 and the second loader arm 618 have a single spike 630, 632. In other implementations, multiple spikes may be arranged on each arm of the first loader arm 616 and the second loader arm 618. For example, two spikes may be arranged linearly, three spikes may be arranged in a triangle, four spikes may be arranged in a square. Any suitable number and arrangement of spikes may be placed on the of the first loader arm 616 and the second loader arm 618 to further engage the hay bale 104.

In some implementations, no spikes 630, 632 are used. For example, when lifting plastic-encased hay bales 104 (i.e., some hay bales 104 may be wrapped silage bales where breaking the plastic encasing the hay bale 104 may result in spoilage), squeezing the hay bale to lift the hay bale 104 can preserve the plastic encasement so the plastic doesn't break and lead to spoilage of the enclosed hay bale 104.

The side loader mechanism 600 includes two plates 638, 640, with one plate 638 coupled to the spike 630 and the other plate 640 coupled to the spike 632. The plates 638, 640 have a diameter greater than the spikes 630, 632. When the first loader arm 616 and the second loader arm 618 move into the engaged position 636, the plates 638, 640 impart a squeezing force to the hay bale 104. The plates 638, 640 increase the gripping of the squeeze action on the hay bale 104 to positively hold the hay bale 104 in place during loading and/or unloading operations.

As shown in FIGS. 6A-6B, the plates 638, 640 have a circular cross-section and are generally conical in along a length extending from the first loader arm 616 and the second loader arm 618. In other implementations, the plates can be oval, triangular, square, or pentagon shaped. Any suitable shape may be used. The plates 638, 640 can have a semi-circular profile. One or more spikes 630, 632 can be coupled to the plates 638, 640 to further couple to the hay bale 104. Such arrangements may better the hay bale 104 depending on the shape and composition of the bale 104 being lifted. For example, some tight square bales of alfalfa bay require alternative shapes of plates and arrangement of spikes to properly engaged and lift.

The side loader mechanism 600 has a hydraulic assembly 642 to operate the first loader arm 616 and the second loader arm 618 between the retracted position 614 (shown in FIG. 6B) and the extended position 612 (shown in FIG. 6A) and the engaged position 636 and the disengaged position 634. The hydraulic assembly 642 includes a hydraulic pump 644 to pressurize the hydraulic fluid in the hydraulic assembly 642 to provide a motive force to the first loader arm 616 and the second loader arm 618. The hydraulic assembly 642 has a hydraulic fluid reservoir 646 as a source for hydraulic fluid. The hydraulic fluid reservoir 646 is fluidly coupled to the hydraulic pump 644 and supplies the hydraulic fluid to the hydraulic pump 644. The hydraulic assembly includes a manifold 648 having multiple control valves, a squeeze cylinder 650, and a rotating cylinder 658. In some implementations, the control valves are electrically operated control valves. The components of the hydraulic assembly 642 are fluidly coupled by hydraulic conduits.

The squeeze cylinder 650 is coupled to the first loader arm 616 and the second loader arm 618 and moves the first loader arm 616 and the second loader arm 618 between the engaged position 636 and the disengaged position 634 to couple to or separate the spikes 630, 632, the plates 638, 640, and the first loader arm 616 and the second loader arm 618 from the hay bale 104. In this implementation, the squeeze cylinder 650 moves the second loader arm 618 between the engaged position 636 spaced to contact the hay bale 104 and the disengaged position 634 spaced apart from the hay bale 104. In other implementations, the squeeze cylinder 650 can move only the first loader arm 616, or both the first loader arm 616 and the second loader arm 618 relative to one another. The squeeze cylinder 650 receives hydraulic fluid from the manifold 648 to extend and retract, repositioning the first loader arm 616 and the second loader arm 618 between the engaged position 636 and the disengaged position 634.

The rotating cylinder 658 is coupled to a connecting bar 660 which is fixed to and extending between the first loader arm 616 and the second loader arm 618. The rotating cylinder 658 extends between the frame 102 and the connecting bar 660. The rotating cylinder 658 extends and retracts responsive to receiving hydraulic fluid from the manifold 648 to pivot the first loader arm 616 and the second loader arm 618 relative to the side 606 of the frame 102. The rotating cylinder 658 moves the first loader arm 616 and the second loader arm 618 between the extended position 612 and the retracted position 614.

The storage assembly 620 is mounted to the frame 102 and positioned relative to the side loader mechanism 600. The storage assembly 620 is positioned to receive the hay bale 104 from the side loader mechanism 600 and reposition the hay bale 104 along the vehicle 100. The storage assembly 620 receives the hay bale 104 from the side loader mechanism 600 at a first location 652 on the vehicle 100 and convey the hay bale 104 along a path relative to the side loader mechanism 600, as shown in the direction of arrow 654, from the first location 652 to a second location 656 on the vehicle 100. In this implementation, the first location 652 is toward the front end 602. The second location 656 can be anywhere along the vehicle from the first location 652 to the rear end 610 of the vehicle 100.

The storage assembly 620 includes a shaft 662 and a storage cylinder 664. The storage cylinder 664 is mounted on the frame 102 and coupled to the shaft 662. The storage cylinder 664 extends and retracts to move the shaft 662. When the hay bale 104 is placed at the first location 652 and the storage cylinder 664 extends, the shaft 662 moves in the direction of arrow 654 and contacts the hay bale 104, moving the hay bale 104 toward the rear end 610, that is, from the first location 652 to the second location 656. After moving the hay bale 104 from the first location 652 to the second location 656, the storage cylinder 664 actuates to retract, and retracts the shaft 662, separating the shaft 662 from the hay bale 104 and positioning the shaft 662 to receive another hay bale 104. When one hay bale 104 is at the second location 656, a second hay bale 104 has been placed at the first location 652, and the storage cylinder 664 operates to move the shaft 662 to contact the second hay bale 104, and subsequently contact the first hay bale 104, simultaneously moving both the hay bales 104 toward the rear end 610.

In some implementations, the storage assembly 620 includes a storage plate 668. The storage plate 668 is coupled to the shaft 662. The storage plate 668 is positioned to impart a force to the hay bale 104 to further push the hay bale 104 from the first location 652 to the second location 656. When the hay bale 104 is placed at the first location 652 and the storage cylinder 664 extends, the storage plate 668 moves in the direction of arrow 654 and contacts the hay bale 104, moving the hay bale 104 toward the rear end 610, that is, from the first location 652 to the second location 656. After moving the hay bale 104 from the first location 652 to the second location 656, the storage cylinder 664 actuates to retract, and retracts the storage plate 668, separating the storage plate 668 from the hay bale 104 and positioning the storage plate 668 to receive another hay bale 104. When one hay bale 104 is at the second location 656, a second hay bale 104 has been placed at the first location 652, and the storage cylinder 664 operates to move the storage plate 668 to contact the second hay bale 104, and subsequently contact the first hay bale 104, simultaneously moving both the hay bales 104 toward the rear end 610.

In some implementations, side loader mechanism 600 can be used in conjunction on the vehicle 100 with the pair of rails 122a, 122b mounted to the frame 102 described in reference to FIGS. 1 and 2A-2B. The rails 122a, 122b are positioned to receive the hay bale 104 from the side loader mechanism 600 at the first location 652.

In some implementations, the side loader mechanism 600 can be used in conjunction on the vehicle 100 with the unloader assembly 300 described in reference to FIGS. 3A-3C. For example, the unloader assembly 300 can remove the hay bale 104 the side loader mechanism 600 and move the hay bale 104 toward the rear end 610. Likewise, the unloader assembly 300 can further remove the hay bale 104 from the vehicle 100 after being loaded by the side loader mechanism 600.

The side loader mechanism 600 includes a power supply 670 to store and deliver electrical power to the hydraulic pump 644 and the manifold 648. In this implementation, the power supply 670 is a battery, however, any suitable power supply 670 may be used.

The side loader mechanism 600 includes a controller 672 and one or more sensors 674, generally similar to the controller and sensors described in this disclosure. The controller 672 is operatively coupled to the hydraulic pump 644 and the manifold 648 to operate the squeeze cylinder 650 and the rotating cylinder 658 to reposition the hay bale 104 with the first loader arm 616 and the second loader arm 618, along with the storage cylinder 664 to move the hay bale 104 along the vehicle 100.

The one or more sensors 674 are mounted at various locations on the frame 102 to sense a position of the hay bale 104 on the ground 110 or on the vehicle 100. The sensors 674 can transmit a signal representing the position of the hay bale 104 to the controller 672.

The controller 672 operates the side loader mechanism 600 and the storage assembly 620 to reposition the hay bale 104 onto and along the vehicle 100. The controller 672 receiving the signal representing the position of the hay bale 104 from the one or more sensors 674, compares the position of the hay bale 104 to an expected position of the hay bale 104 to obtain a comparison result, and operates the side loader mechanism 600 and the storage assembly 620 to alter a location of the hay bale 104 based on the comparison result.

The controller 672 can operate the side loader mechanism 600 when the sensors 674 detect a hay bale 104 on the ground 110 to be retrieved and placed on the vehicle by generating command signals to the hydraulic pump 644 to energize and the manifold 648 to reposition control valves to extend and retract the rotating cylinder 658 and the squeeze cylinder 650 to reposition the hay bale 104. For example, the command signals can operate manifold 648 to supply hydraulic fluid to the rotating cylinder 658, extending the rotating cylinder 658 and manipulating the first loader arm 616 and the second loader arm 618 from the retracted position 614 to the extended position 612. The controller 672 can then generate command signals to the manifold 648 to reposition the control valves to supply hydraulic fluid to the squeeze cylinder 650, extend the squeeze cylinder 650 and manipulating one or both of the first loader arm 616 and the second loader arm 618 to the disengaged position 634 to fit the first loader arm 616 and the second loader arm 618 around the hay bale 104. In other implementations, the squeeze cylinder 650 can be operated first, then the rotating cylinder 658 operated to position the first loader arm 616 and the second loader arm 618 about the hay bale 104. Then, the controller 672 can generate command signals to the manifold 648 to the squeeze cylinder 650 to retract, moving the first loader arm 616 and the second loader arm 618 to the engaged position 636, engaging the first loader arm 616 and the second loader arm 618 to squeeze the hay bale 104 with the spikes 630, 632 penetrating the hay bale 104.

The controller 672 can then generate command signals to move the squeezed hay bale 104 onto the vehicle 100. For example, when the sensors 674 detect the hay bale 104 has been squeezed between the first loader arm 616 and the second loader arm 618, the controller 672 can then generate command signals to the manifold 648 to reposition the control valves and supply hydraulic fluid to the rotating cylinder 658 to retract, manipulating the first loader arm 616 and the second loader arm 618 from the extended position 612 to the retracted position 614 with the hay bale 104 squeezed between the first loader arm 616 and the second loader arm 618. Responsive to manipulating the first loader arm 616 and the second loader arm 618 to the retracted position 614 with the hay bale 104 on the spikes 630, 632, the hay bale 104 is positioned on the vehicle 100 at the first location 652. When the sensors 674 detect the hay bale 104 at the first location 652, the controller 672 can generate command signals to the manifold 648 to the squeeze cylinder 650 to extend, moving the first loader arm 616 and the second loader arm 618 from the engaged position 636 to the disengaged position 634. When the first loader arm 616 and the second loader arm 618 move from the engaged position 636 to the disengaged position 634, the first loader arm 616 and the second loader arm 618 are disengaged from the hay bale 104. The controller 672 can then generate a command signal to the manifold 648 to reposition the control valves and supply hydraulic fluid to the rotating cylinder 658 to move the first loader arm 616 and the second loader arm 618 to an intermediate position between the extended position 612 and the retracted position 614 so the storage assembly 620 can reposition the hay bale 104 along the vehicle 100.

The controller 672 can then generate command signals to the storage assembly 620 to move the hay bale 104 along the vehicle 100. For example, the controller 672 can generate command signals to the storage cylinder 664 to extend and convey the shaft 662 and the storage plate 668 along the path relative in the direction of arrow 654 to the side loader mechanism 600, contacting the storage plate 668 and the shaft 662 to the hay bale 104, conveying the storage plate 668, the shaft 662, and the hay bale 104, moving the hay bale 104 the first location 652 to the second location 656.

When one hay bale 104 has been placed on the vehicle, and a second hay bale 104 is placed at the first location 652, the controller 672 can generate command signals to the storage assembly 620 to move the second hay bale 104 from the first location 652 to contact the second hay bale 104 to the first hay bale 104 by generating command signals to the storage cylinder 664 to extend and convey the shaft 662 and the storage plate 668 along the path relative in the direction of arrow 654 to the side loader mechanism 600, contacting the storage plate 668 and the shaft 662 to the second hay bale 104, conveying the storage plate 668, the shaft 662, and the first and second hay bales 104, moving the first and second hay bales 104 simultaneously in the direction of arrow 654.

In some implementations, the first loader arm 616 and the second loader arm 618 can pivot independently about the side 606 of the frame 102. The controller 672 can generate command signals operating the first loader arm 616 and the second loader arm 618 independently. The rotating cylinder 658 can include a separate rotating cylinder for each of the first loader arm 616 and the second loader arm 618. The controller 672 can, based on signals from the sensors 674, generate command signals to the rotating cylinder associated with the first loader arm 616 to extend, manipulating the first loader arm 616 from the retracted position 614 to the extended position 612, generate a command signal to the rotating cylinder to manipulating the first loader arm 616 to align the spike 630 into a position to engage the hay bale 104, and then generate a command signal to the squeeze cylinder 650 to extend or retract as required to move the first loader arm 616 to the engaged position 636 so the spike 630 pierces the hay bale 104. The sensors 674 then detect a condition of the hay bale 104 indicating that the first loader arm 616 and the second loader arm 618 are both required to squeeze the hay bale 104 to reposition the hay bale. For example, the hay bale 104 can be unconsolidated such that a single spike 630 would only lift a portion of the hay bale 104 or cause the hay bale 104 to partially or completely disintegrate, so the second loader arm 618 (along with the spike 632 and the plates 638, 640) are required to lift and reposition the hay bale 104. The controller 672 can then generate command signals to the manifold 648 to reposition control valves to extend the rotating cylinder associated with the second loader arm 618, thus manipulating the second loader arm 618 from the retracted position 614 to the extended position 612; manipulating the second loader arm 618 to a position to engage the hay bale 104 by adjusting the extension of the associated rotating cylinder, moving the second loader arm 618 from the disengaged position 634 to the engaged position 636; and responsive to moving the second loader arm 618 from the disengaged position 634 to the engaged position 636, squeezing the hay bale 104 between the first loader arm 616 and the second loader arm 618.

In another embodiment, a control system for a side loader mechanism used to position a hay bale on a vehicle includes multiple sensors and a controller. The sensors sense the position of a hay bale and transmit a signal representing the position of the hay bale to the controller. The controller receives the signals representing the position of the hay bale from one or more of the sensors, compares the position of the hay bale to an expected position of the hay bale to obtain a comparison result, and based on the comparison result, operates the side loader mechanism to alter a location of the hay bale relative to a trailer. The controller operates the side loader mechanism by generating command signals to manipulate a first loader arm having a first spike and a second loader arm having a second spike from a retracted position to an extended position; manipulating the first loader arm and the second loader arm to a position to contact the hay bale; moving the first loader arm and the second loader arm to an engaged position; responsive to moving the first loader arm and the second loader arm to the engaged position, squeezing the hay bale; manipulating the first loader arm and the second loader arm from the extended position to the retracted position with the hay bale squeezed between the first loader arm and the second loader arm; responsive to manipulating the first loader arm and the second loader arm to the retracted position with the hay bale on the spike, positioning the hay bale on an vehicle; moving the first loader arm and the second loader arm from the engaged position to a disengaged position; responsive to moving the first loader arm and the second loader arm from the engaged position to the disengaged position, disengaging the first loader arm and the second loader arm from the hay bale; and moving the first loader arm and the second loader arm to an intermediate position.

Figure 7:
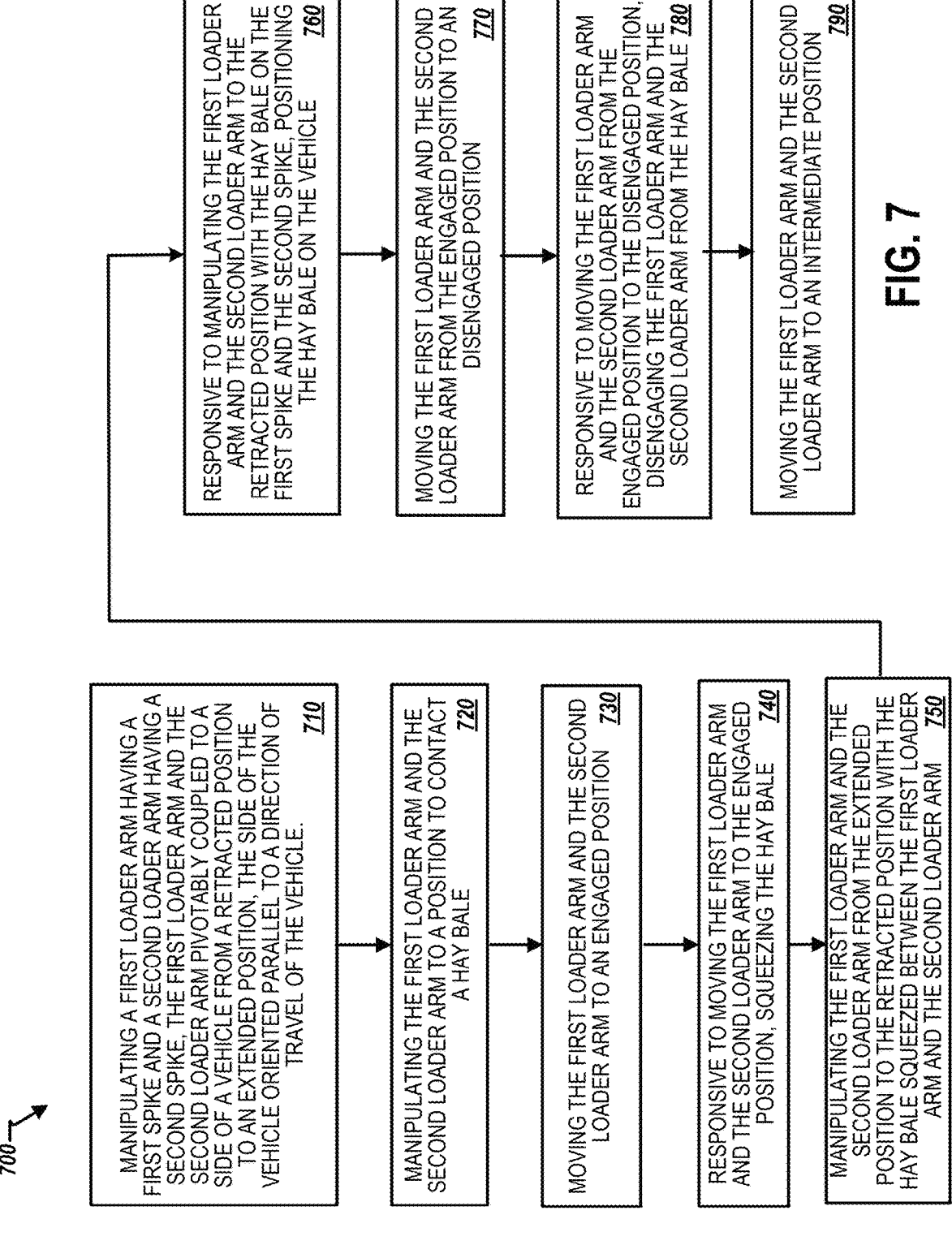
FIG. 7 shows a flow diagram of an example process for operating a side loader mechanism to load a hay bale onto a vehicle.

Referring to FIG. 7, a process for operating a side loader mechanism to load a hay bale onto a vehicle is described. At 710, a first loader arm having a first spike and a second loader arm having a second spike are manipulating from a retracted position to an extended position. The first loader arm and the second loader arm are pivotably coupled to a side of the vehicle. The side of the vehicle is oriented parallel to a direction of travel of the vehicle. For example, the side loader mechanism 600 includes the first loader arm 616 with a first spike 630 and a second loader arm 618 with a second spike 632 which can be pivoted relative to the side 606 of the frame 102 between the retracted position 614 and the extended position 612.

At 720, the first loader arm and the second loader arm are manipulated to a position to contact a hay bale. For example, the height of the first loader arm 616 and the second loader arm 618 can be adjusted relative to the ground 110 and/or the center of the hay bale 104 to align the spikes 630, 632 to pierce the hay bale 104 by the controller 672 sending command signals to the manifold 648 to extend and retract the rotating cylinder 658.

At 730, the first loader arm and the second loader arm are moved to an engaged position. For example, the first loader arm 616 and the second loader arm 618 can be moved from the disengaged position 634 to the engaged position 636.

At 740, responsive to moving the first loader arm and the second loader arm to the engaged position, the hay bale is squeezed. For example, the spikes 630, 632 pierce the hay bale 104 and the plates 638, 640 contact the hay bale 104 on opposite sides of the hay bale 104, compressing and squeezing the hay bale 104.

At 750, the first loader arm and the second loader arm are manipulated from the extended position to the retracted position with the hay bale squeezed between the first loader arm and the second loader arm. For example, the first loader arm 616 and the second loader arm 618 are maintained in the engaged position 636 and the controller 672 operates the rotating cylinder 658 to pivot the hay bale 104 to the retracted position 614.

At 760, responsive to manipulating the first loader arm and the second loader arm to the retracted position with the hay bale on the first spike and the second spike, the hay bale is positioned on the vehicle. For example, when the first loader arm 616 and the second loader arm 618 are placed in the retracted position 614, the hay bale 104 is in the first location 652 on the pair of rails 122a, 122b.

At 770, the first loader arm and the second loader arm are moved from the engaged position to a disengaged position. For example, the sensors 674 detect the hay bale 104 at the first location 652, and based on this condition, the controller 672 generates a command signal to the manifold 648 to flow hydraulic fluid to the squeeze cylinder 650 to extend and move the first loader arm 616 and the second loader arm 618 to the disengaged position 634.

At 780, responsive to moving the first loader arm and the second loader arm from the engaged position to the disengaged position, the first loader arm and the second loader arm is disengaged from the hay bale. For example, when the first loader arm 616 and the second loader arm 618 are moved to the disengaged position 634 the spikes 630, 632 and the plates 638, 640 are separated from the hay bale 104.

At 790, the first loader arm and the second loader arm are moved to an intermediate position. For example, the controller 672 can generate command signals to the manifold 648 to direct hydraulic fluid to the rotating cylinder 658 to pivot the first loader arm 616 and the second loader arm 618 to a position between the retracted position and the extended position where the first loader arm 616 and the second loader arm 618 are clear of the hay bale 104.

In some implementations, operating a side loader mechanism includes conveying the hay bale along a path relative to the side of the vehicle in a first direction and moving the hay bale a first location to a second location in the first direction. For example, As used herein, the terms "orthogonal", "substantially orthogonal", or "generally orthogonal" refer to a relation between two elements (e.g., lines, axes, planes, surfaces, or components) that form a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-2 degrees).

As used herein, the terms "aligned," "substantially aligned," "parallel," "substantially parallel," "flush," or "substantially flush" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device. Similarly, two surfaces can be considered to be flush or substantially flush if both surfaces generally lie within the same plane, but may have a slight offset that is within acceptable tolerances may still exist between the surfaces.

As used herein, terms describing relative directions or orientations (e.g., front, back/rear, distal, proximate, top/upper, bottom/lower) of various elements are used in reference to the to the center of the hay bale trailer. Thus, for example, the distal end or surface of a component refers to that end or surface of the component that is furthest from the center of the hay bale trailer. Similarly, for example, the proximate end or surface of a component refers to that end or surface of the component that is closest to the center of the hay bale trailer. Likewise, for example, the top/upper edge or surface of a component refers to that edge or surface of the component that is farthest from the ground (the surface of the earth) or facing the sky (upward). Finally, for example, the bottom/lower edge or surface of a component refers to that edge or surface of the component that is nearest or facing the ground.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A vehicle comprising:
a frame comprising a side oriented parallel to an intended direction of travel of the vehicle;
a side loader mechanism pivotably coupled to the side of the frame and configured to pivot between an extended position and a retracted position, the side loader mechanism comprising: a first loader arm and a second loader arm configured to open and close relative to one another, to thereby, squeeze a hay bale between respective ends of the first loader arm and the second loader arm, wherein at least one of the first loader arm or the second loader arm comprise a spike extending from its respective end and parallel to the side of the frame; and
a storage assembly mounted to the frame and positioned relative to the side loader mechanism, the storage assembly comprising a storage plate, the storage assembly configured to:
receive the hay bale from the side loader mechanism at a first location on the vehicle;
remove, by the storage plate with the first loader arm in the retracted position, the hay bale from the first location in a first direction; and
convey, by the storage plate with the first loader arm and the second loader arm in the retracted position, the hay bale along a path relative to the side loader mechanism, from the first location to a second location on the vehicle.

2. The vehicle of claim 1, wherein the first loader arm and the second loader arm rotate relative to the side of the frame orthogonal to a direction of forward movement of the vehicle.

3. The vehicle of claim 1, wherein the second loader arm comprises a spike extending outwards from an end of and orthogonal to the second loader arm, when in the extended position the second loader arm extends outside the frame with the spike oriented parallel to the side of the frame toward a rear end of the vehicle.

4. The vehicle of claim 1, wherein the first loader arm and the second loader arm are operable between a disengaged position spaced apart from the hay bale and an engaged position squeezing the hay bale.

5. The vehicle of claim 4, wherein the first loader arm and the second loader arm each comprise a plate coupled to the spike, the plates configured to impart a squeezing force to the hay bale when the first loader arm and the second loader arm are in the engaged position.

6. The vehicle of claim 1, wherein the hay bale is a first hay bale and when the first hay bale has been placed on the vehicle, the storage assembly is further configured to:
convey the storage plate along the path relative to the side loader mechanism to remove a second hay bale from the first location as the storage plate is conveyed along the path and with the first loader arm in the retracted position;
receive the second hay bale on the vehicle, the second hay bale in contact with the first hay bale; and
simultaneously move the first hay bale and the second hay bale farther along the vehicle.

7. The vehicle of claim 1, further comprising an unloader assembly comprising:
an unloader bar;
an unloader arm coupled to and extending from the unloader bar, the unloader arm arranged to engage a forward surface of the hay bale;
a pulley coupled to the unloader bar; and
a winch comprising a cable, the winch coupled to the frame at a first location, the cable extending from the winch through the pulley to a second location on the frame, wherein responsive to the winch decreasing a length of the cable, the unloader arm transposes the hay bale in a second direction opposite the first direction.

8. The vehicle of claim 7, wherein the unloader assembly is further configured to, as the unloader arm transposes the hay bale in the second direction, remove the hay bale from the vehicle.

9. The vehicle of claim 7, wherein the winch is configured to freewheel extending a length of the cable responsive the storage plate moving along the path relative to the side loader mechanism as the storage plate removes the hay bale from the spike as the storage plate is conveyed along the path in the first direction and with the first loader arm in the retracted position.

10. The vehicle of claim 7, further comprising a control system comprising:
a plurality of sensors configured to:
sense a position of the hay bale; and
transmit a signal representing the position of the hay bale; and
a controller configured to perform operations comprising:
receiving the signal representing the position of the hay bale;
comparing the position of the hay bale to an expected position of the hay bale to obtain a comparison result; and
based on the comparison result, operating the side loader mechanism and the storage assembly to alter a location of the hay bale.

11. The vehicle of claim 10, wherein operating the side loader mechanism comprises:
manipulating the first loader arm and the second loader arm from the retracted position to the extended position;
manipulating the first loader arm and the second loader arm to a disengaged position;

moving the first loader arm and the second loader arm to an engaged position; and responsive to moving the first loader arm and the second loader arm to the engaged position, squeezing the hay bale.

12. The vehicle of claim 11, wherein operating the side loader mechanism further comprises:

manipulating the first loader arm and the second loader arm from the extended position to the retracted position with the hay bale squeezed between the first loader arm and the second loader arm;

responsive to manipulating the first loader arm and the second loader arm to the retracted position with the hay bale on the spike, positioning the hay bale on the vehicle;

moving the first loader arm and the second loader arm from the engaged position to the disengaged position;

responsive to moving the first loader arm and the second loader arm from the engaged position to the disengaged position, disengaging the first loader arm and the second loader arm from the hay bale; and moving the first loader arm and the second loader arm to an intermediate position.

13. The vehicle of claim 12, wherein operating the storage assembly comprises:

conveying the storage plate along the path relative to the side loader mechanism in the first direction, contacting the storage plate to the hay bale;

conveying the storage plate and the hay bale along the path relative to the side loader mechanism in the first direction; and moving the hay bale the first location to the second location in the first direction.

14. The vehicle of claim 13, wherein the hay bale is a first hay bale, operating the storage assembly comprises:

responsive to sensing a second hay bale in contact with the storage assembly, conveying the storage plate along the path relative to the side loader mechanism in the first direction;

contacting the storage plate to the second hay bale;

conveying the storage plate and the second hay bale along the path relative to the side loader mechanism in the first direction to contact the first hay bale; and simultaneously removing the second hay bale from the spike and moving the first hay bale and the second hay bale in the first direction.

15. The vehicle of claim 14, wherein the controller is further configured to perform operations comprising:

rotating a drum of the winch;

responsive to rotating a drum of the winch, reducing a length of the cable;

responsive to reducing the length of the cable, conveying the unloader arm and the first and second hay bales in a second direction opposite the first direction; and responsive to conveying the unloader arm and the first and second hay bales in the second direction, removing at least one of the first and second hay bales from the vehicle.

16. The vehicle of claim 10, wherein the first loader arm and the second loader arm are configured to pivot independently about an axis substantially parallel to the side of the frame, operating the side loader mechanism comprises:

manipulating the first loader arm from the retracted position to the extended position;

manipulating the first loader arm to align the spike of the first loader arm to engage the hay bale;

moving the first loader arm to an engaged position;

responsive to moving the first loader arm to the engaged position, piercing the hay bale with the spike of the first loader arm;

detecting a condition of the hay bale indicating that the first loader arm and the second loader arm are both required to squeeze the hay bale to reposition the hay bale;

manipulating the second loader arm from the retracted position to the extended position;

manipulating the second loader arm to a position to engage the hay bale;

moving the second loader arm from a disengaged position to the engaged position; and responsive to moving the second loader arm from the disengaged position to the engaged position, squeezing the hay bale between the first loader arm and the second loader arm.

17. A control system comprising:

a plurality of sensors configured to:

sense a position of a hay bale; and transmit a signal representing the position of the hay bale; and a controller configured to perform operations comprising:

receiving the signal representing the position of the hay bale from one or more of the plurality of sensors;

comparing the position of the hay bale to an expected position of the hay bale to obtain a comparison result; and based on the comparison result, operating a side loader assembly to alter a location of the hay bale relative to a trailer by performing sub-operations comprising:

manipulating a first loader arm comprising a first spike and a second loader arm comprising a second spike from a retracted position to an extended position;

manipulating the first loader arm and the second loader arm to a position to contact the hay bale;

moving the first loader arm and the second loader arm to an engaged position;

responsive to moving the first loader arm and the second loader arm to the engaged position, squeezing the hay bale;

manipulating the first loader arm and the second loader arm from the extended position to the retracted position with the hay bale squeezed between the first loader arm and the second loader arm;

responsive to manipulating the first loader arm and the second loader arm to the retracted position with the hay bale on the first spike and the second spike, positioning the hay bale on a vehicle;

moving the second loader arm from the engaged position to a disengaged position;

responsive to moving the second loader arm from the engaged position to the disengaged position, disengaging the second loader arm from the hay bale;

moving the second loader arm to an intermediate position; and conveying, with the first loader arm in the retracted position and the second loader arm in the intermediate position, a storage plate along a path from the side loader assembly at a first location to a second location on the trailer to move the hay bale from the first location as the storage plate is conveyed along the path in a first direction.

* * * * *